United States Patent
Hidaka

(10) Patent No.: US 9,020,082 B2
(45) Date of Patent: Apr. 28, 2015

(54) ADAPTIVE CONTROL OF LOW-FREQUENCY EQUALIZERS

(75) Inventor: Yasuo Hidaka, Cupertino, CA (US)

(73) Assignee: Fujitsu Limited, Kawasaki-shi (JP)

( * ) Notice: Subject to any disclaimer, the term of this patent is extended or adjusted under 35 U.S.C. 154(b) by 143 days.

(21) Appl. No.: 13/602,904

(22) Filed: Sep. 4, 2012

(65) Prior Publication Data

US 2014/0064351 A1    Mar. 6, 2014

(51) Int. Cl.
*H03D 1/06*    (2006.01)
*H04L 25/03*    (2006.01)
*H04L 27/01*    (2006.01)

(52) U.S. Cl.
CPC .......... *H04L 27/01* (2013.01); *H04L 25/03057* (2013.01)

(58) Field of Classification Search
CPC ...................................... H04L 1/0045
USPC ........................................... 375/348
See application file for complete search history.

(56) References Cited

U.S. PATENT DOCUMENTS

2009/0207900 A1*    8/2009    Beukema et al. ............. 375/232

* cited by examiner

*Primary Examiner* — Lihong Yu
(74) *Attorney, Agent, or Firm* — Baker Botts L.L.P.

(57) ABSTRACT

A method includes, by a detector, receiving from a low frequency equalizer a data signal and an error signal, matching a tail portion of the data signal to a tail portion of an extended filter-pattern, and, based upon the error signal at a given location of the data signal and upon the imbalance, producing an output signal indicating whether a long-term residual intersymbol interference of the data signal in the error signal has a positive sign or a negative sign. The tail portion of the extended filter-pattern includes an imbalance between a count of each of the possible values and an unfixed sequence. The data signal includes data points with one of at least two possible values.

24 Claims, 27 Drawing Sheets

| EXTENDED FILTER PATTERN | TAIL PATTERN (200 BITS) | MIDDLE PATTERN (100 BITS) | FILTER PATTERN $D_0$ $D_1$ $D_2$ $D_3$ $D_4$ $D_5$ $D_6$ | | | | | | | ERROR (DETECTED AT $D_4$) $E_4$ | LONG-TERM RESIDUAL ISI |
|---|---|---|---|---|---|---|---|---|---|---|---|
| $EFP_1$ | NUMBER OF 1's ≥ 122 BITS NUMBER OF 0's ≤ 78 BITS | NUMBER OF 0's = 50 BITS ± 2 | 0 | 1 | 0 | 1 | 0 | 1 | 0 | 1 | +1 |
| | | | | | | | | | | 0 | −1 |
| $EFP_0$ | NUMBER OF 0's ≤ 122 BITS NUMBER OF 1's ≥ 78 BITS | NUMBER OF 1's = 50 BITS ± 2 | | | | | | | | 1 | −1 |
| | | | | | | | | | | 0 | +1 |
| ∘∘∘ | ∘∘∘ | ∘∘∘ | ∘∘∘ | | | | | | | ∘∘∘ | ∘∘∘ |
| | | OTHERWISE | | | | | | | | X | 0 |

3200, 3202, 3204, 3206

DATA VALUE:

BOUNDARY VALUE: $E_{4.5}$

| DATA PATTERN | $D_0$ | $D_1$ | $D_2$ | $D_3$ | $D_4$ | $D_5$ | $D_6$ | $E_{4.5}$ | $h_{+1.5}$ |
|---|---|---|---|---|---|---|---|---|---|
| DATA PATTERN H | -1 | -1 | +1 | +1 | -1 | +1 | -1 | +1 | POSITIVE |
| | | | | | | | | -1 | NEGATIVE |
| DATA PATTERN L | | | | -1 | | | | +1 | NEGATIVE |
| | | | | | | | | -1 | POSITIVE |

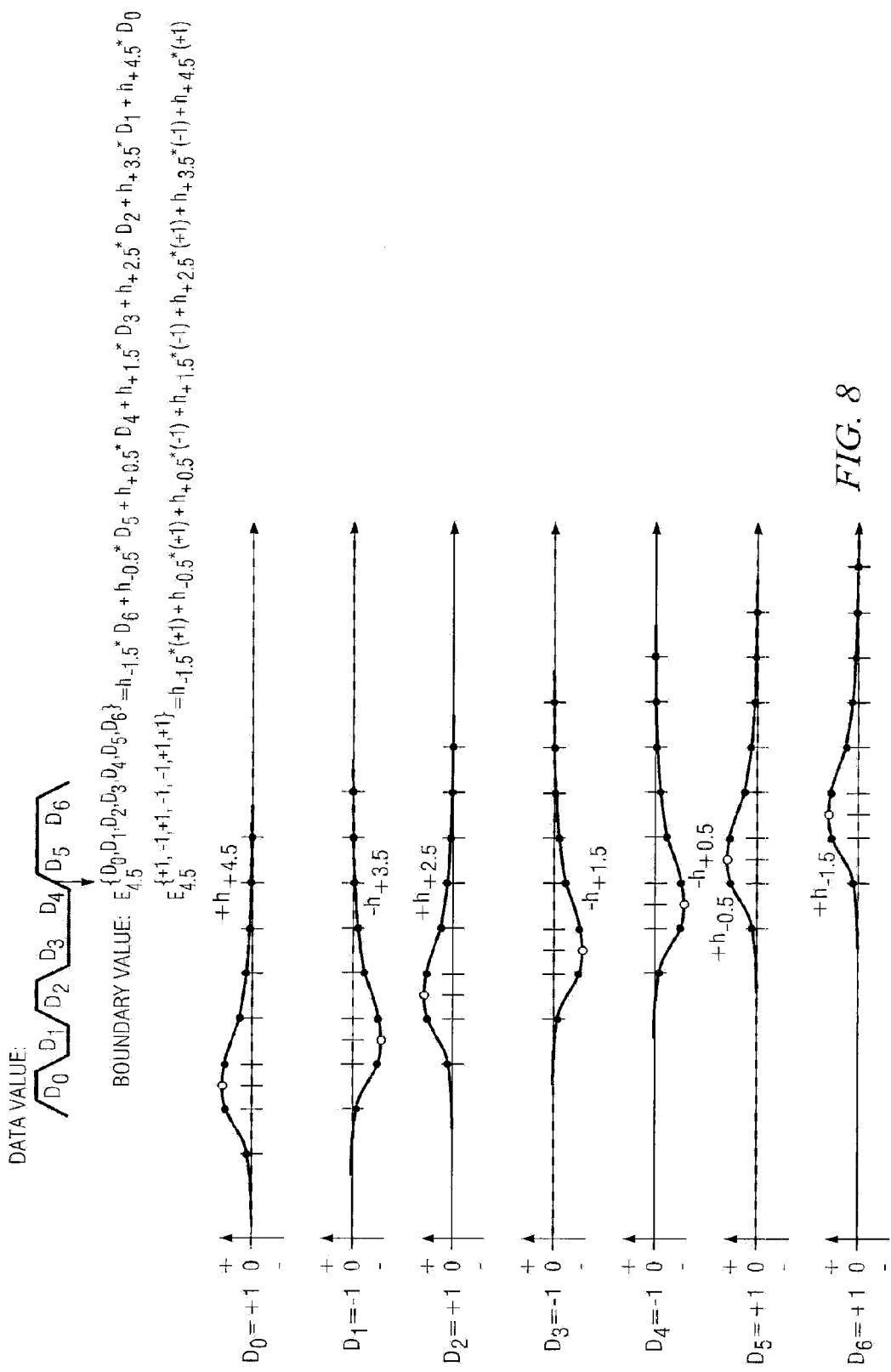

| PATTERN SET | DATA PATTERN | $D_0$ | $D_1$ | $D_2$ | $D_3$ | $D_4$ | $D_5$ | $D_6$ | $E_{4.5}$ | $h_{+2.5}$ |
|---|---|---|---|---|---|---|---|---|---|---|
| PATTERN SET R | DATA PATTERN H | +1 | +1 | +1 | | | | | +1 | POSITIVE |
| | | | | | | | | | -1 | NEGATIVE |
| | DATA PATTERN L | -1 | -1 | -1 | | | | | +1 | NEGATIVE |
| | | | | | | | | | -1 | POSITIVE |
| PATTERN SET F | DATA PATTERN H | | | +1 | +1 | +1 | -1 | +1 | +1 | POSITIVE |
| | | | | | | | | | -1 | NEGATIVE |
| | DATA PATTERN L | | | -1 | -1 | -1 | -1 | -1 | +1 | NEGATIVE |
| | | | | | | | | | -1 | POSITIVE |

*FIG. 14*

TP: SIGNIFICANTLY MORE 1's THAN 0's OR SIGNIFICANTLY MORE 0's THAN 1's
~TP: OPPOSITE OF TP
MP: (NEARLY) BALANCED NUMBER OF 0's AND 1's
FP: FIXED SEQUENCE OF 0's AND 1's WITH BALANCED ISI

| EXTENDED FILTER PATTERN | TAIL PATTERN (200 BITS) | MIDDLE PATTERN (100 BITS) | FILTER PATTERN $D_0$ $D_1$ $D_2$ $D_3$ $D_4$ $D_5$ $D_6$ | ERROR (DETECTED AT $D_4$) $E_4$ | LONG-TERM RESIDUAL ISI |
|---|---|---|---|---|---|
| $EFP_1$ | NUMBER OF 1's ≥ 122 BITS NUMBER OF 0's ≤ 78 BITS | NUMBER OF 0's = 50 BITS ± 2 NUMBER OF 1's = 50 BITS ± 2 | 0  1  0  1  0  1  0 | 1 | +1 |
|  |  |  |  | 0 | −1 |
|  |  |  |  | 1 | −1 |
| $EFP_0$ | NUMBER OF 0's ≤ 122 BITS NUMBER OF 1's ≥ 78 BITS |  | ∘ ∘ ∘ | 0 | +1 |
| ∘ ∘ ∘ | ∘ ∘ ∘ | ∘ ∘ ∘ |  | ∘ ∘ ∘ | ∘ ∘ ∘ |
|  | OTHERWISE |  |  | X | 0 |

3200 ← table
3202 → $EFP_1$ row
3204 → $EFP_0$ row
3206 → OTHERWISE row

FIG. 30

ADAPTIVE CONTROL OF LOW-FREQUENCY EQUALIZERS

TECHNICAL FIELD

This disclosure relates generally to electrical communication and, more specifically, to adaptive control of low-frequency equalizers.

BACKGROUND

A transmission channel may distort high-frequency ("HF") signals communicated through it. The distortion may be a result of frequency-dependent signal attenuation caused, for example, by skin effect or dielectric effect in the transmission channel and may vary according to one or more characteristics of the transmission channel, such as a length or an insulator material of the transmission channel. To compensate for the distortion, a transmitter transmitting signals through the transmission channel may include a pre-emphasis driver. A receiver receiving the signals through the transmission channel may include one or more equalizers.

SUMMARY

In one embodiment, a method includes, by a detector, receiving from a low frequency equalizer a data signal and an error signal, matching a tail portion of the data signal to a tail portion of an extended filter-pattern, and, based upon the error signal at a given location of the data signal and upon the imbalance, producing an output signal indicating whether a long-term residual intersymbol interference of the data signal in the error signal has a positive sign or a negative sign. The tail portion of the extended filter-pattern includes an imbalance between a count of each of the possible values and an unfixed sequence. The data signal includes data points with one of at least two possible values.

In another embodiment, an article of manufacture includes a non-transitory computer readable medium and computer-executable instructions carried on the computer readable medium. The instructions are readable by a processor. The instructions, when read and executed, cause the processor to receive from a low frequency equalizer a data signal and an error signal, match a tail portion of the data signal to a tail portion of an extended filter-pattern, and, based upon the error signal at a given location of the data signal and upon the imbalance, produce an output signal indicating whether a long-term residual intersymbol interference of the data signal in the error signal has a positive sign or a negative sign. The tail portion of the extended filter-pattern includes an imbalance between a count of each of the possible values and an unfixed sequence. The data signal includes data points with one of at least two possible values.

In yet another embodiment a system includes a low-frequency equalizer coupled to a detector. The detector includes a first extended filter-pattern. The detector is configured to receive from the low frequency equalizer a data signal and an error signal, match a tail portion of the data signal to a tail portion of the extended filter-pattern, and, based upon the error signal at a given location of the data signal and upon the imbalance, produce an output signal indicating whether a long-term residual intersymbol interference of the data signal in the error signal has a positive sign or a negative sign. The tail portion of the extended filter-pattern includes an imbalance between a count of each of the possible values and an unfixed sequence. The data signal includes data points with one of at least two possible values.

The object and advantages of the invention will be realized and attained by means of at least the features, elements, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 8 illustrates example convolution of example residual boundary ISI and an example data sequence.

FIG. 14 illustrates example sets of data sequences for detecting residual boundary ISI.

FIG. 30 is an illustration of an example truth table for finite state machines providing adaptive control of low-frequency equalizers.

DESCRIPTION OF EXAMPLE EMBODIMENTS

Figure 1:
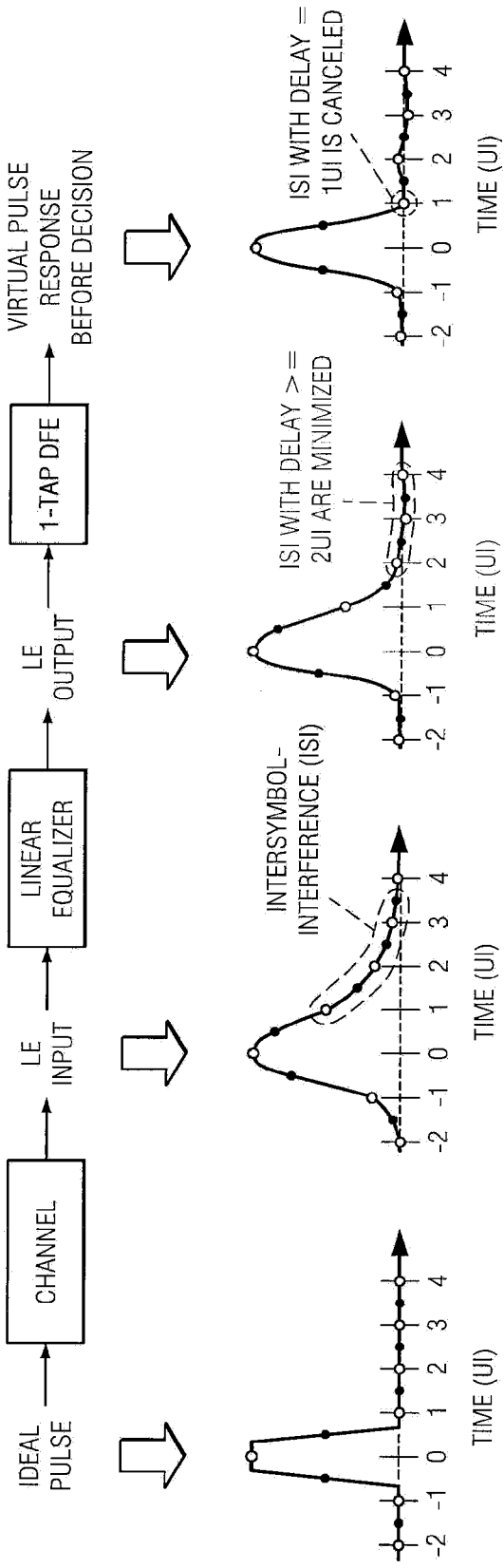
FIG. 1 illustrates example pulse responses of an example transmission channel, an example linear equalizer ("LE"), and an example decision feedback equalizer ("DFE").

FIG. 1 illustrates example pulse responses of an example transmission channel, an example linear equalizer ("LE"), and an example decision feedback equalizer ("DFE"). The transmission channel may communicate a signal from a transmitter to a receiver that includes the LE and the DFE, which may process the received signal. The LE and DFE may communicate the processed signal in any suitable manner to a decision circuit or any other circuit components. After transmission over channel, the received signal (or pulse) has a long tail due to high-frequency loss in the transmission channel. The long tail may cause intersymbol interference ("ISI") because the long tail interferes with successively transmitted symbols. In particular embodiments, there may be two symbols, such as the set of (0 and 1) or (−1 and +1). In such embodiments, "0" or "−1" may represent logical zero or "false" values, while "1" may represent logical one or "true" values. In other embodiments, three symbols may be used, such as the set of (0, 1, and 2) or (−2, 0, and +2). In yet other embodiments, four symbols may be used, such as the set of (0, 1, 2, and 3) or (−3, −1, +1, and +3). The present disclosure contemplates any suitable symbols. In FIG. 1, the LE may moderately amplify an attenuated high-frequency component of the received signal to reduce residual ISI occurring after a particular delay. If the DFE after the LE is a 1-tap DFE, the LE may reduce residual ISI occurring after a delay of 2.0 unit intervals (UIs), as FIG. 1 illustrates. The DFE may cancel the residual ISI occurring more immediately after the pulse. If the DFE is a 1-tap DFE (as in FIG. 1) the DFE may use a feedback loop from a decision circuit in the DFE to cancel residual ISI occurring after a delay of 1.0 UI. In particular embodiments, the LE and 1-tap DFE may apply compensation as illustrated in FIG. 1 that minimizes and cancels residual ISI occurring after particular unit intervals of delay. The LE and 1-tap DFE may reduce residual ISI occurring after particular unit intervals of delay.

The receiver may include any suitable equalizer or combination of equalizers for receiving, at an input port, the signal from the transmitter and applying a gain, offset, or other modification to the signal according to parameters that specify an amount of compensation to apply to the signal. Such parameters may be adaptive, which may be desirable when one or more characteristics of the transmission channel are unknown. The receiver may also include equalizer-control logic for adjusting such parameters. U.S. Patent Application Publication No. 2007/0280383, entitled System and Method for Adjusting Compensation Applied to a Signal and published 6 Dec. 2007, which is incorporated herein by reference, further describes adjusting equalizer parameters to compensate for signal distortion. One or more of the equalizers in the receiver may utilize a feedback signal, applying the feedback signal to the signal from the transmitter to compensate for distortion in the signal. The present disclosure may refer to circuit components applying compensation for distortion in a signal as being part of an adaptive equalizer or an adaptive equalizer control system. Herein, reference to an adaptive equalizer may encompass an adaptive equalizer control system, and vice versa, where appropriate. For example, in FIG. 1, an adaptive equalizer control system may include an LE and a DFE to provide two-dimensional adaptive equalizer control.

An adaptive equalizer control system may include an LE to reduce residual ISI with greater than or equal to approximately 2.0 UIs of delay. If an LE applies too little amplification, the pulse response may include a long tail of residual interference greater than zero over multiple UIs of delay. For example, the pulse response may demonstrate residual interference greater than zero over approximately 2.5, 3.0, and 3.5 UIs of delay. On the other hand, if an LE applies too much amplification, the pulse response may include a long tail of residual interference less than zero over multiple UIs of delay. The particular components chosen for an adaptive equalizer control system may depend on one or more characteristics of the transmission channel. For example, communication through particular transmission channels may benefit only slightly, if at all, from the use of a DFE. Particular adaptive equalizer control systems may utilize only an LE (without a DFE) to reduce residual ISI with greater than or equal to approximately 1.0 UIs of delay or with greater than or equal to even less than approximately 1.0 UIs of delay.

Particular embodiments may utilize adaptive equalization as described herein in contexts other than signal transmission. As an example and not by way of limitation, particular embodiments may apply adaptive equalization as described herein to a recording channel, such as a magnetic, optical, or other recording channel.

Figure 2:
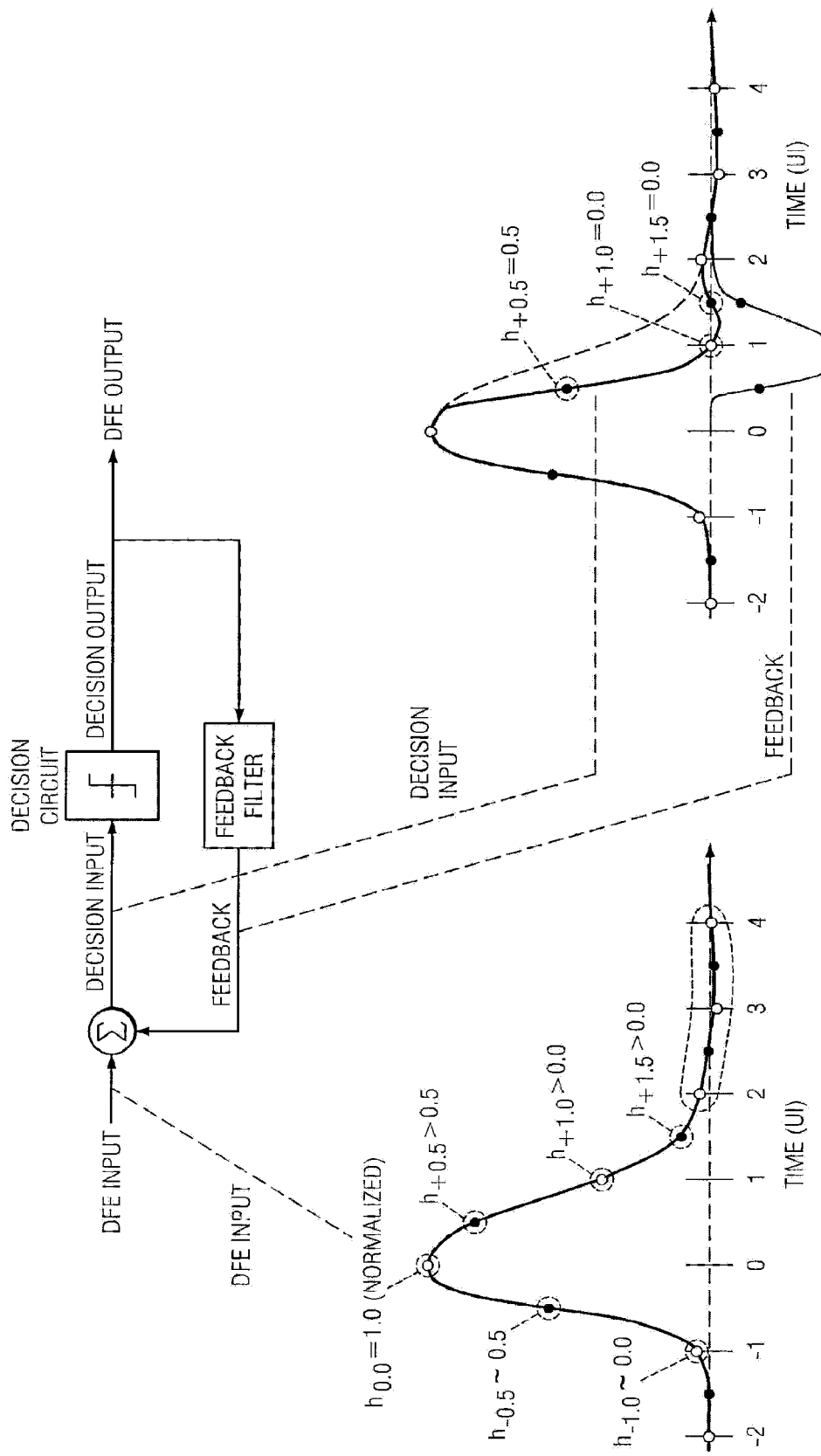
FIG. 2 illustrates an example DFE.

FIG. 2 illustrates an example DFE. The DFE receives DFE input, combines the DFE input with a feedback signal generated by a feedback filter, processes the combined signal using a decision circuit that performs sampling and 1-bit analog-to-digital ("A/D") conversion, and outputs DFE output. The feedback signal cancels residual ISI in the DFE input. Herein, "cancel" may mean "reduce," where appropriate. For a 1-tap DFE, the feedback signal may have a negative peak at approximately 1.0 UIs. For a 2-tap DFE, the feedback signal may have a negative peak at approximately 1.0 UIs and 2.0 UIs. In FIG. 2, the feedback signal has a nonzero value at approximately 0.5 UIs and 1.5 UIs and has a zero value at all other discrete timings with an interval of 0.5 UIs. In particular embodiments, the DFE does not utilize feedback from less than or equal to 0.5 UIs of prior data. Instead, the DFE combines the feedback signal with later UIs of prior data.

In particular embodiments, the DFE includes a feedback loop having a 1-tap feedback filter similar to a duo-binary partial-response equalizer without pre-coding and employs a speculative technique to unroll the feedback loop. Although the present disclosure describes and illustrates particular DFEs including particular combinations of particular components for particular adaptive control using particular adaptive control algorithms, the present disclosure contemplates any suitable DFEs including any suitable combinations of any suitable components for any suitable adaptive control using any suitable adaptive control algorithms. As an example and not by way of limitation, particular embodiments may utilize adaptive control that is based on one or more conventional adaptive control algorithms, such as, for example, a Least-Mean-Square ("LMS") algorithm, a Sign-Sign-Least-Mean-Square ("SS-LMS") algorithm, or a Zero-Forcing ("ZF")

algorithm. As another example, particular embodiments may utilize a sign-based ZF algorithm that does not require measuring quantities of residual ISI. In particular embodiments, LEs (in addition to DFEs) may utilize one or more adaptive control algorithms.

Figure 3:
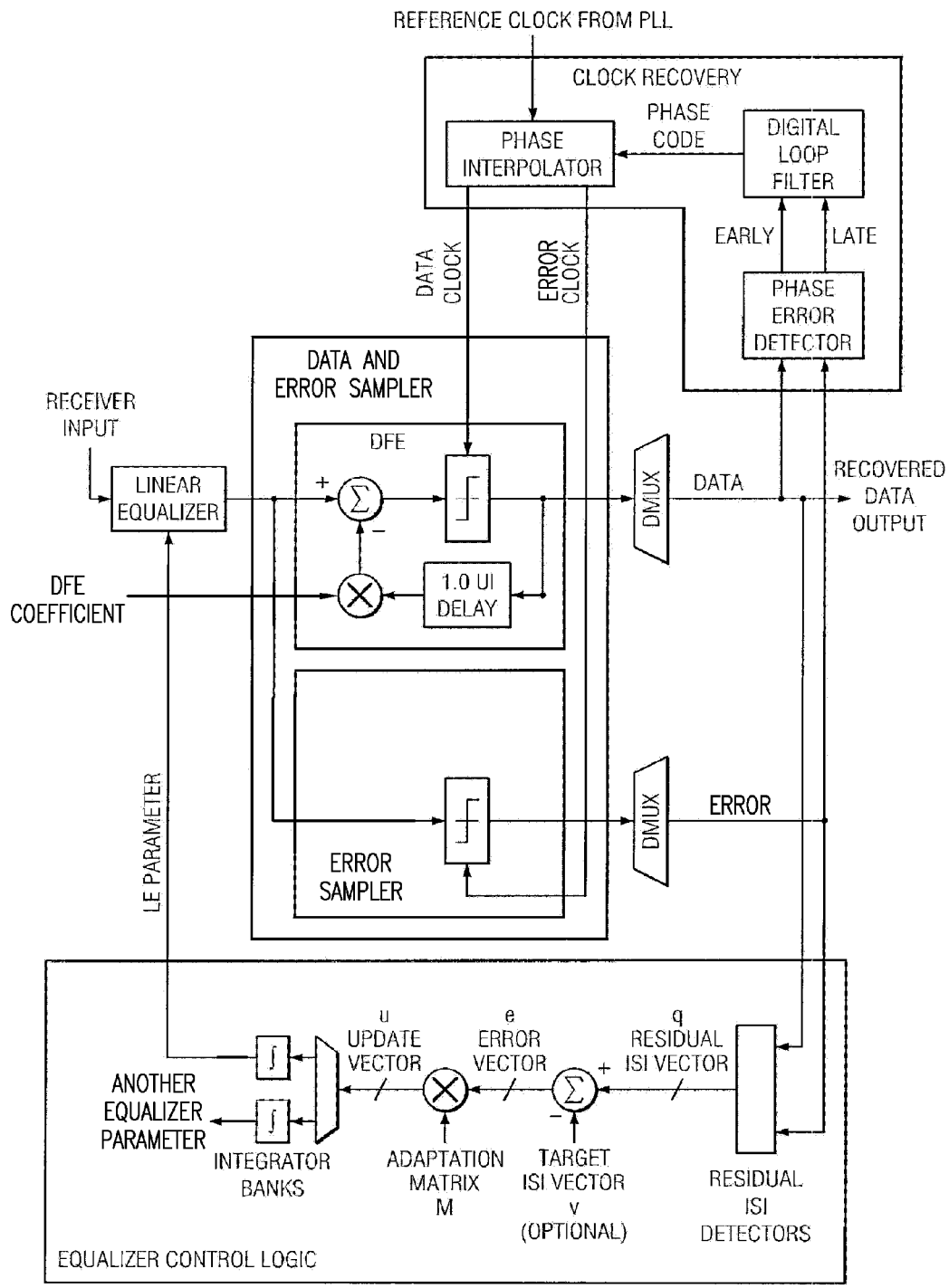
FIG. 3 illustrates an example system for adaptive control of an example LE.

FIG. 3 illustrates an example system for adaptive control of an example LE. The outputs of the DFE and the error sampler are demultiplexed and then used by clock-recovery and equalizer-control logic. The demultiplexed data is used as the recovered data output. The clock-recovery logic uses a reference clock from a phase-locked loop (PLL). The clock-recovery logic detects phase error from the demultiplexed data and error values, processes the phase error using a digital filter to adjust a phase code for a data clock and an error clock, and generates the data clock and the error clock based on the reference clock and the phase code. In particular embodiments, the clock-recovery logic adjusts the phase code based on 0.5 UIs of delay from the error clock to the data clock. In particular embodiments, the clock-recovery logic adjusts the phase code based on 0.3 UIs of delay from the error clock to the data clock.

The equalizer-control logic in FIG. 3 may receive recovered data output and recovered error output and generate and transmit equalizer parameters for controlling the amount of compensation for an equalizer to apply. In particular embodiments, equalizer-control logic may uses one or more residual ISI detectors to detect a residual ISI vector from the demultiplexed data and error values and uses integrators to generate equalizer parameters. As used herein, the phrase "residual ISI" may refer to one or more "residual ISI vectors" or one or more vector values of residual ISI vectors, except where a particular "residual ISI component" is specified. A residual ISI vector may be produced using any mathematical operations that produce vector output from any type of data, such as, for example, scalar data and vector data, and may have any length. Mathematical operations used to produce vector values may be performed any number of times to produce any number of vector values for any number of vectors. In particular embodiments, equalizer-control logic may require additional hardware such as a monitoring circuit to adaptively control equalizer parameters. Alternatively, equalizer-control logic may adaptively control equalizer parameters using a scheme that does not require additional hardware such as a monitoring circuit, which may, for example, increase loading to a high-speed analog circuit and power consumption. Equalizer-control logic may adaptively control any suitable control parameter such as, for example, LE gain, DFE coefficient, and offset code, or any combination of suitable control parameters. Equalizer-control logic may adaptive control low-frequency equalizer as described below.

In particular embodiments, equalizer-control logic may include an adaptation matrix. For example, the equalizer-control logic may force residual ISI toward zero by detecting residual ISI and integrating each residual ISI component with a different weight according to the adaptation matrix, where weight depends on at least the equalizer type and the residual ISI. In particular embodiments, the equalizer-control logic includes a vector of binary values representing the sign of residual ISI components. In particular embodiments for processing recovered data output, equalizer-control logic may include a target ISI vector and subtracts the target ISI vector from the residual ISI vector. The target ISI vector may be, for example, the residual ISI vector observed in the best known state (with respect to bit-error rate (BER)) for the worst-case transmission channel. In particular embodiments, equalizer-control logic may be compatible with any correlated data sequences, including monotone sequences (such as a repeated 0-1-0-1 pattern).

The equalizer-control logic in FIG. 3 may be implemented using any suitable technique, such as General Zero-Forcing or Gauss-Newton algorithms. With General Zero-Forcing algorithms, there is no optional target ISI vector (i.e. v=0), and the adaptation matrix is calculated as a Jacobian (derivative) matrix of the impulse response (or the residual ISI vector) of the worst-case channel and the equalizer combined together with respect to the vector of equalizer control variables. For the worst-case channel, it will minimize the sum of squares of the residual ISI in the equilibrium state. For other channels, the sum of squares of the residual ISI is not necessarily minimized in the equilibrium state, but the operating margin is usually bigger than the worst-case channel for a wide range of channel characteristics. A problem of General Zero-Forcing is that it assumes linearity of the system, and the bit error rate (BER) is not necessarily minimized for the worst-case channel even if the sum of square of the residual ISI is minimized.

One or more of these problems may be solved by using an optional target ISI vector and a Gauss-Newton algorithm, where the target ISI vector is the residual ISI vector observed in the best known state (with respect to BER) for the worst-case channel. As in General Zero-Forcing, the adaptation matrix is a Jacobian (derivative) matrix indexing an impulse response (or the residual ISI vector) for the worst-case channel, an equalizer-type, and a vector of equalizer-control variables. Contrary to the Jacobian (derivative) matrix used in General Zero-Forcing, the adaptation matrix indexes the impulse response observed in the best known state (with respect to BER) for the worst-case channel, whereas the Jacobian (derivative) matrix in the General Zero-Forcing algorithm is thought to be state independent because General Zero-Forcing assumes linearity of the system. By using the target ISI vector and a Gauss-Newton algorithm, we may minimize BER in the equilibrium state for the worst-case channel.

Figure 4:
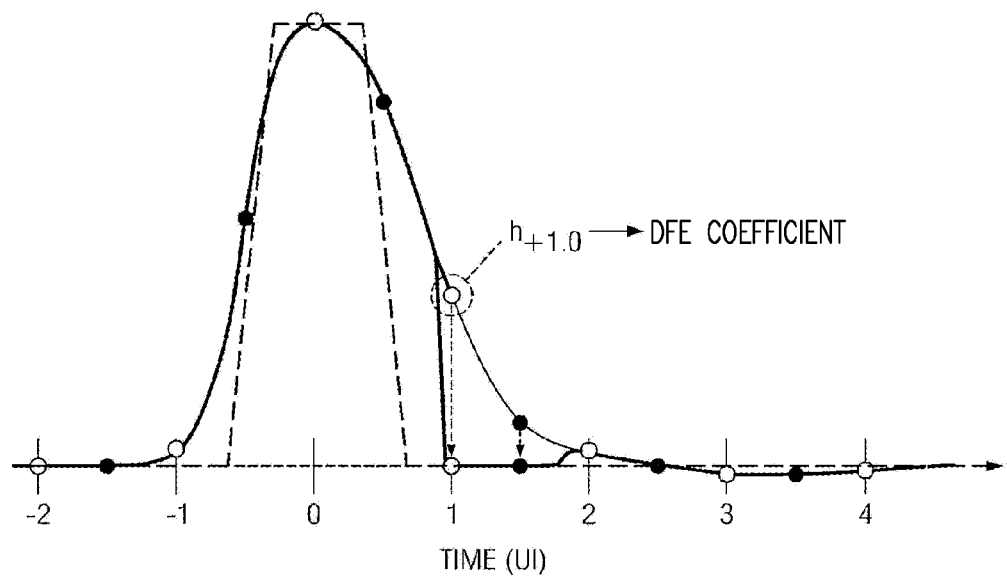
FIG. 4 illustrates an example pulse response at an output of an example LE and example coefficients.

FIG. 4 illustrates an example pulse response at an output of an example LE and example DFE coefficient. The pulse response of the LE output at 1.0 UI of delay ($h_{+1,0}$) corresponds to the DFE coefficient for 1.0 bit of prior data.

Figure 5:
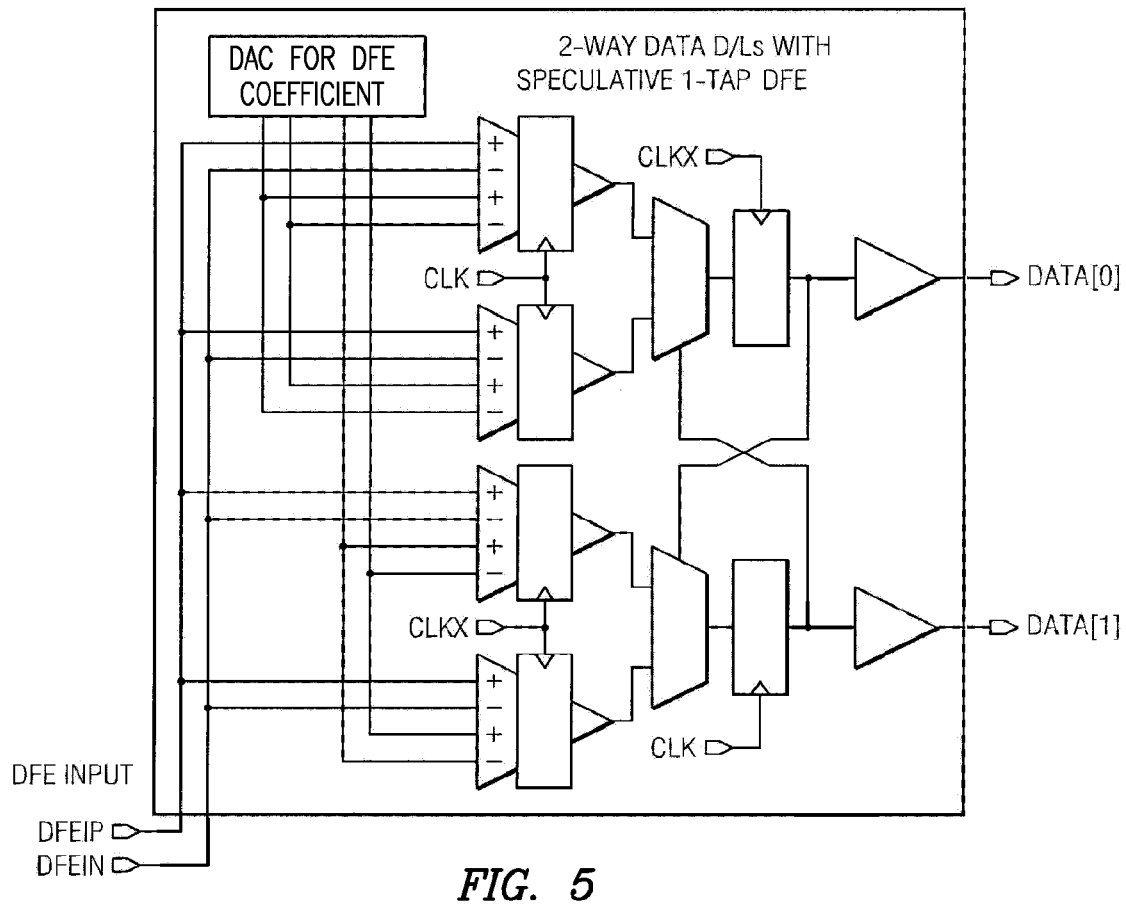
FIG. 5 illustrates an example speculative 1-tap DFE.

FIG. 5 illustrates an example speculative 1-tap DFE. The example speculative 1-tap DFE uses a speculative technique (also known as a loop-unrolling technique) to reduce residual ISI in the pulse response at the DFE input. In particular embodiments, instead of generating a real analog feedback signal to apply to the DFE input before the decision circuit as shown in FIGS. 2 and 3, two decision circuits may be used in parallel at substantially the same timing. One decision circuit adds a DFE coefficient to the input, and another decision circuit subtracts the DFE coefficient from the input. After speculative decisions are made, one of the results may be chosen based on previously received data (1 bit of prior data). In particular embodiments, the DFE input is a differential signal and the DFE coefficient is a reference voltage. The polarity of the DFE coefficient is flipped by swapping the positive and negative signals of the reference voltage for the DFE coefficient.

The example speculative 1-tap DFE illustrated in FIG. 5 provides an example of an equalizer that applies compensation for distortion in parallel. Compensation for distortion may be applied in parallel in any suitable manner (e.g., before or after distortion occurs) using any suitable equalization technique (e.g., transmitter pre-emphasis equalization or receiver equalization) and any suitable equalizer (e.g., an analog continuous-time first-order derivative filter, an analog continuous-time second-order derivative filter, a multi-tap finite-impulse-response filter, a 1-tap DFE, a 2-tap DFE or a multi-tap DFE). In particular embodiments, compensation for distortion may be applied in series in any suitable manner using any suitable equalization technique and any suitable equalizer.

Figure 6:
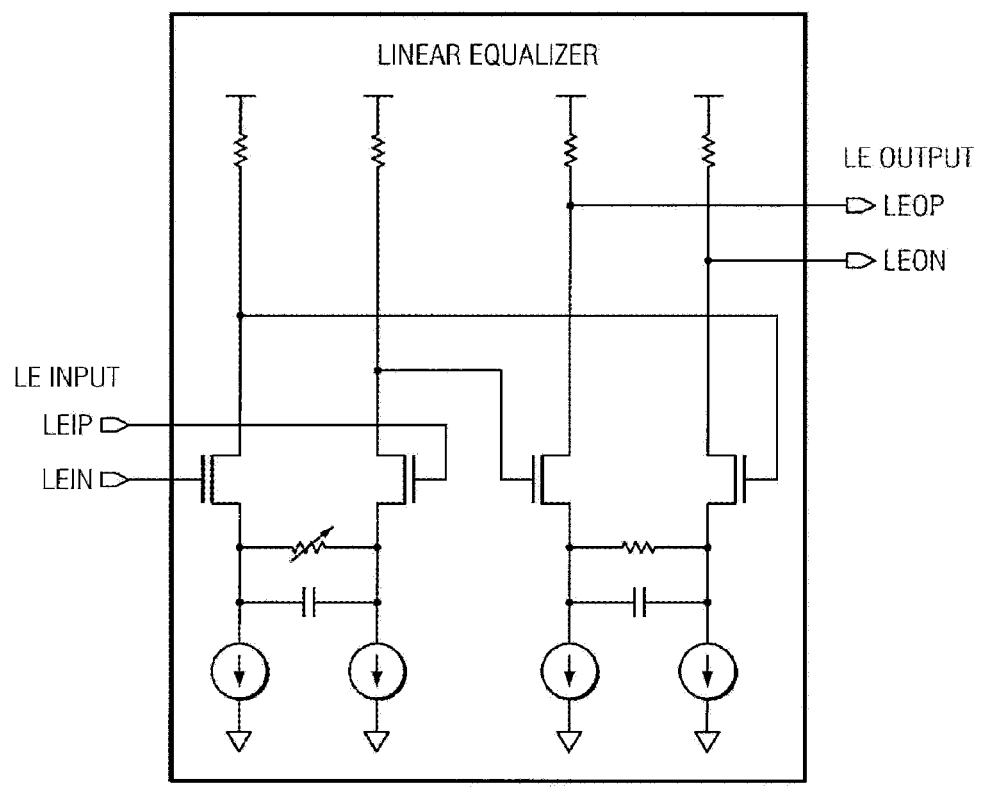
FIG. 6 illustrates an example LE.
Figure 7:
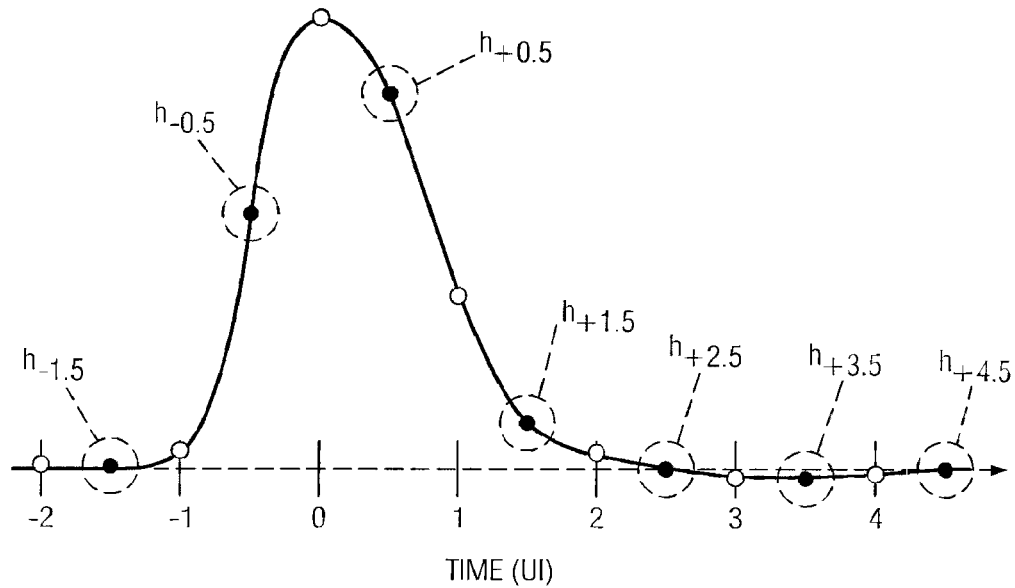
FIG. 7 illustrates example residual boundary intersymbol interference ("ISI") in an example pulse response at an output of an example LE.

FIG. 6 illustrates an example LE. The LE includes two-stage differential buffers with capacitive and resistive degeneration. In particular embodiments, an LE parameter is adjusted by adjusting one of the degeneration resistors. In particular embodiments, residual ISI occurring after a particular UI of delay may be minimized by adjusting the LE parameter and observing the change in the residual ISI. Any suitable LE (such as, for example, a first or second order derivative filter) may be used to reduce residual ISI occurring after a particular UI of delay. FIG. 7 illustrates example residual boundary ISI in an example pulse response at an output of an example LE. While receiving a continuous data sequence, the boundary value seen by the boundary DFE may be represented as the convolution of the residual boundary ISI and the data sequence, as FIG. 8 shows. FIG. 8 illustrates example convolution of an example residual boundary ISI and an example data sequence. As an example and not by way of limitation, if the receiving data sequence is $\{D_0, D_1, D_2, D_3, D_4, D_5, D_6\}$, the boundary value $E_{4.5}$ between $D_4$ and $D_5$ may be represented as:

$$E_{4.5}^{\{D_0,D_1,D_2,D_3,D_4,D_5,D_6\}} \approx h_{-1.5}D_6 + h_{-0.5}D_5 + h_{+0.5}D_4 + h_{+1.5}D_3 + h_{-2.5}D_2 + h_{+3.5}D_1 + h_{+4.5}D_0$$

with additional terms for more distant data being omitted because their effect is small.

In FIG. 8, the data points of the data sequence D include $D_0$, $D_1$, $D_2$, $D_3$, $D_4$, $D_5$, and $D_6$. The boundary points are illustrated as darkened circles on either side of the unfilled circles. Clock-recovery or equalizer-control logic may sample the recovered data output at a data point to generate a data value (e.g. $D_0$-$D_6$) and at a boundary point to generate a boundary value (e.g. $E_{0.5}$-$E_{5.5}$). Each sampled data value and boundary value may be a low value, a high value, or a random value that randomly takes a high value or a low value. In particular embodiments, a low value is a "0," a high value is a "1," a random value is either a "0" or a "1," and an average of random values is "0.5." In particular embodiments, a low value is a "−1," a high value is a "1," a random value is either a "−1" or a "1," and an average of random values is "0." A change from a high to a low value or from a low to a high value between two successive data values is a transition. In FIG. 8, transitions occur between low data value D4 and high data value D5, between high data value D0 and low data value D1, between low data value D1 and high data value D2, and between high data value D2 and low data value D3. In a signal exhibiting no residual ISI effects, each boundary value between two successive data values with opposite values is typically a random value. For such a signal, the equalizer-control logic may adjust the gain applied to the DFE input up or down randomly, as ISI effects are already being fully compensated or do not exist. If the number of up adjustments substantially equals the number of down adjustments, the gain applied to the input signal may remain, on average, at substantially the same level. If the number of up adjustments does not substantially equal the number of down adjustments, the gain applied to the input signal may drift slightly from its initial level. Such drift of the gain level may produce slight residual ISI. The equalizer-control logic may detect this ISI and adjust the gain back to the average initial level.

In particular embodiments, an equalizer may control more than one independent parameter, such as, for example, the unmodified, first-order-derivative, and second-order-derivative components of a signal. Generally, "first-order-derivative" components are the result of a "first-order-derivative" operation, which uses any suitable electronic component or collection of components or circuitry, such as, for example, a high-pass filter, to produce an output that is linearly proportional to the first-order derivative of an incoming signal with respect to time. According to particular embodiments, a derivative operation takes the derivative of an incoming signal with respect to time, such as, for example, the voltage change of the incoming signal per 100 pico-seconds. Derivative operations may be applied to a signal once or multiple times, resulting in an output signal that is proportional to the first, second, third, or higher order derivative of the incoming signal with respect to time based on the number of times the derivative operation is applied. Examples of multiparameter (or multidimensional) equalizers include 2-tap DFEs, which may independently control a first control parameter and a second control parameter, and 3-tap finite impulse response (FIR) filters, which may independently control a second control parameter and a third control parameter. The present disclosure contemplates any suitable multidimensional equalizer. In particular embodiments, compensation is adjusted independently for each independent equalizer parameter. Adaptive equalizer control may be applied to a first control parameter independently by adjusting the first control parameter while the other control parameters remain fixed. In a 2-tap DFE, for example, the first- and second-tap coefficients may be adjusted independently, and each of these adjustments may comprise an adjustment to the compensation for distortion. Alternatively, multidimensional equalizers may adjust compensation according to more than one control parameter at substantially the same time (in the aggregate) by adjusting compensation according to a particular function that incorporates more than one independent parameter.

Compensation for distortion (such as, for example, gain) may be adjusted independently for each independent control parameter based on particular relationships between a sampled boundary value that is between successive data values that resulting in a transition and one or more sampled data values before or after the boundary value in particular timings. Particular relationships may correspond to particular types of ISI for particular independent equalizer parameters. When, for example, an adaptive equalizer-control system detects such relationships among a sampled boundary value and sampled data values (e.g. using predefined data-value patterns) adaptive equalizer control may be adjusted by adjusting the one or more particular independent equalizer parameters.

In particular embodiments, the predefined data value patterns used by the adaptive equalizer-control system to compare with the incoming stream of sampled data values may be sensitive to ISI for particular independent control parameters. These patterns may be selected, for example, based on the sensitivity of the boundary value between data values resulting in a transition to the independent control parameter being adjusted. In particular embodiments, these patterns may be selected based on the partial derivative of the pulse response at that independent control parameter (e.g., on the sign or magnitude of the partial derivative) because the boundary value seen by the error sampler may be represented as a convolution of the residual boundary ISI and the data sequence, as FIG. 8 shows.

Figure 9:
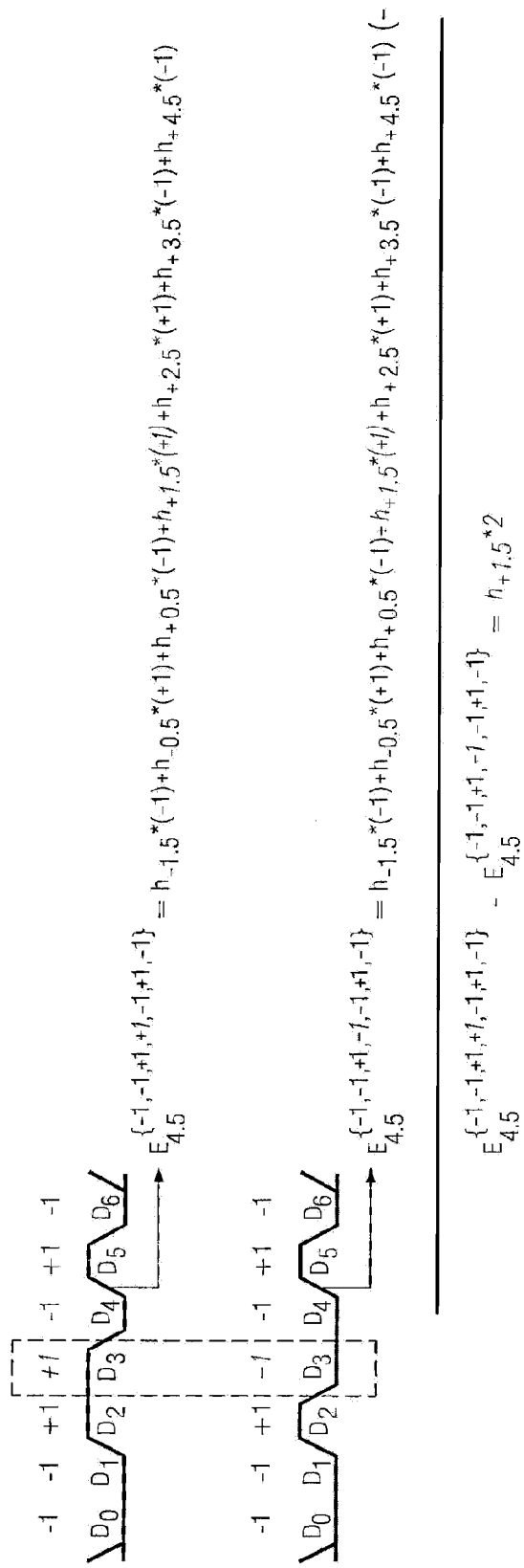
FIG. 9 illustrates example detection of residual boundary ISI based on one or more boundary-value differences between two data sequences.

FIG. 9 illustrates example detection of residual boundary ISI based on one or more data-value differences between two data sequences. In particular embodiments, residual boundary ISI may be measured by taking a difference in boundary values between two data sequences which have different data values in the data bits corresponding to the residual boundary ISI to be measured. In the illustrated example, $h_{+1.5}$ is measured by taking a difference in boundary values $E_{4.5}$ between $D_4$ and $D_5$ for two data sequences which have different data values at $D_3$. Data values $D_0$, $D_1$, $D_2$, $D_4$, $D_5$ and $D_6$ are the same for both data sequences. Each data value and boundary value may comprise a low value, a high value, or a random value that takes either a high value or a low value randomly. In particular embodiments, each data value and boundary value may comprise a quantity, which may be measured, for example, at full-range precision analog level. In particular embodiments, only the sign (not the quantity) of the boundary values is used to measure the boundary-value differences.

In particular embodiments, residual boundary ISI may be measured for its sign and for its magnitude to some degree by taking statistical differences of the binary boundary values for the two data sequences as long as the binary boundary values are not statistically saturated. For example, the probabilities of +1 (or −1) boundary values are the same for the two data sequences in FIG. 9, if and only if the residual boundary ISI $h_{+1.5}$ is absolutely zero. Otherwise, the probability of +1 boundary values is higher (or lower) for the data sequence with $D_3$ equal to +1 than the data sequence with $D_3$ equal to −1, depending on whether the residual boundary ISI at 1.5 UIs of delay ($h_{+1.5}$) is positive or negative. The amount of statistical difference indicates the magnitude of the residual boundary ISI at 1.5 UIs of delay ($h_{+1.5}$).

If the binary boundary values are statistically saturated, the difference in binary boundary values between the two data sequences is zero and thus cannot be used to measure residual boundary ISI. To prevent statistical saturation of the binary boundary values between the two data sequences, the number of high values present in the other data values (e.g. $D_0$, $D_1$, $D_2$, $D_4$, $D_5$ and $D_6$ in FIG. 9) used to calculate the difference in boundary values between the two data sequences is close to (and thus balanced with) the number of low values present in the other data values (e.g. $D_0$, $D_1$, $D_2$, $D_4$, $D_5$ and $D_6$ in FIG. 9) used to calculate the difference in boundary values between the two data sequences. By watching for various filter patterns in a balanced manner, adaptive equalizer control may become more independent of incoming data sequences. For example, there may be some data dependency for some periodic or quasi-periodic data sequences where a periodic or quasi-periodic data sequence does not include one or some of the filter patterns at all. In such a case, one scheme may be to wait for the filter pattern expecting that the current incoming data sequence changes at some point in the future. Another scheme may be to skip filter patterns that may not appear in the current incoming data sequence.

In particular embodiments, $D_4$ and $D_5$ must have different data values to make a transition at $E_{4.5}$ where a boundary value $E_{4.5}$ is measured. If $D_4$ and $D_5$ have the same value, the binary boundary value $E_{4.5}$ is completely statistically saturated, because $E_{4.5}$ always takes the same value as $D_4$ and $D_5$. The boundary value $E_{4.5}$ is not statistically saturated, only if $D_4$ and $D_5$ have different values and there is a data transition at $E_{4.5}$.

In particular embodiments, balanced application of adaptive control actions enables adaptive control algorithms to provide consistent adaptation results among various data sequences. Balanced application of adaptive control actions may be achieved by selecting data sequences for the adaptive control actions. In particular embodiments, if data sequences observed during adaptation are limited, the data sequences for residual ISI detection may be chosen from those data sequences observed during adaptation. For example, adaptive control applied for 10GBASE-CX4 starts with the 8B10B idle data sequence which consists of only 8B10B/A/, /K/, /S/ symbols because the initial incoming data sequence at start up may be an idle data sequence. It may be desirable to avoid data sequences which do not appear in the 8B10B idle data sequence, at least during link initialization. Otherwise, the link will not start up. Once initialization is complete, equalizer-control logic may use data sequences that appear in real data traffic, not idle data sequences.

Figure 10:
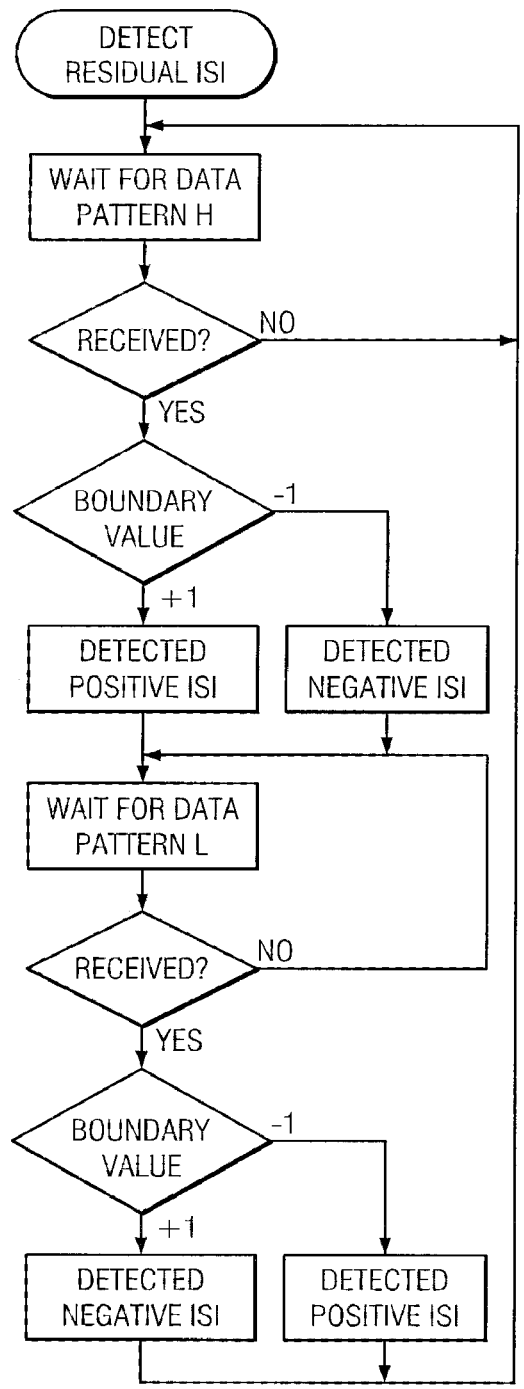
FIG. 10 illustrates example statistical detection of residual boundary ISI using two data sequences.

FIG. 10 illustrates example statistical detection of residual boundary ISI using two data sequences. In particular embodiments, data pattern H and L have different values in the data bits corresponding to the residual boundary ISI to be measured. FIG. 10 illustrates an example method for statistically detecting residual ISI using two data sequences. This method includes calculating a difference between the two data sequences. In particular embodiments, it is advantageous to use only one data sequence to detect boundary residual ISI in an aggregate manner. To use one data sequence, the example method shown in FIG. 10 may be modified to include the portion related to data pattern H and not include the portion related to data pattern L.

Figure 11:
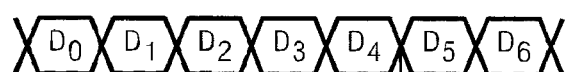
FIG. 11 illustrates two example data sequences for detecting example residual boundary ISI.

FIG. 11 illustrates two example data sequences for detecting example residual boundary ISI at 1.5 UIs of delay ($h_{+1.5}$). Herein, the terms "pattern" and "sequence" may be used interchangeably, where appropriate. Since data patterns H and L are watched for alternatively, two data patterns are taken into account the same number of times over a long term. In particular embodiments, the two data patterns behave in opposite regarding the polarity of boundary values. In particular embodiments, the statistical difference of the boundary values between two data patterns which are taken into account the same number of times may correspond to the actual difference over a long term for any incoming data sequence, even if data pattern H is received much more frequently than data pattern L.

Figure 12:
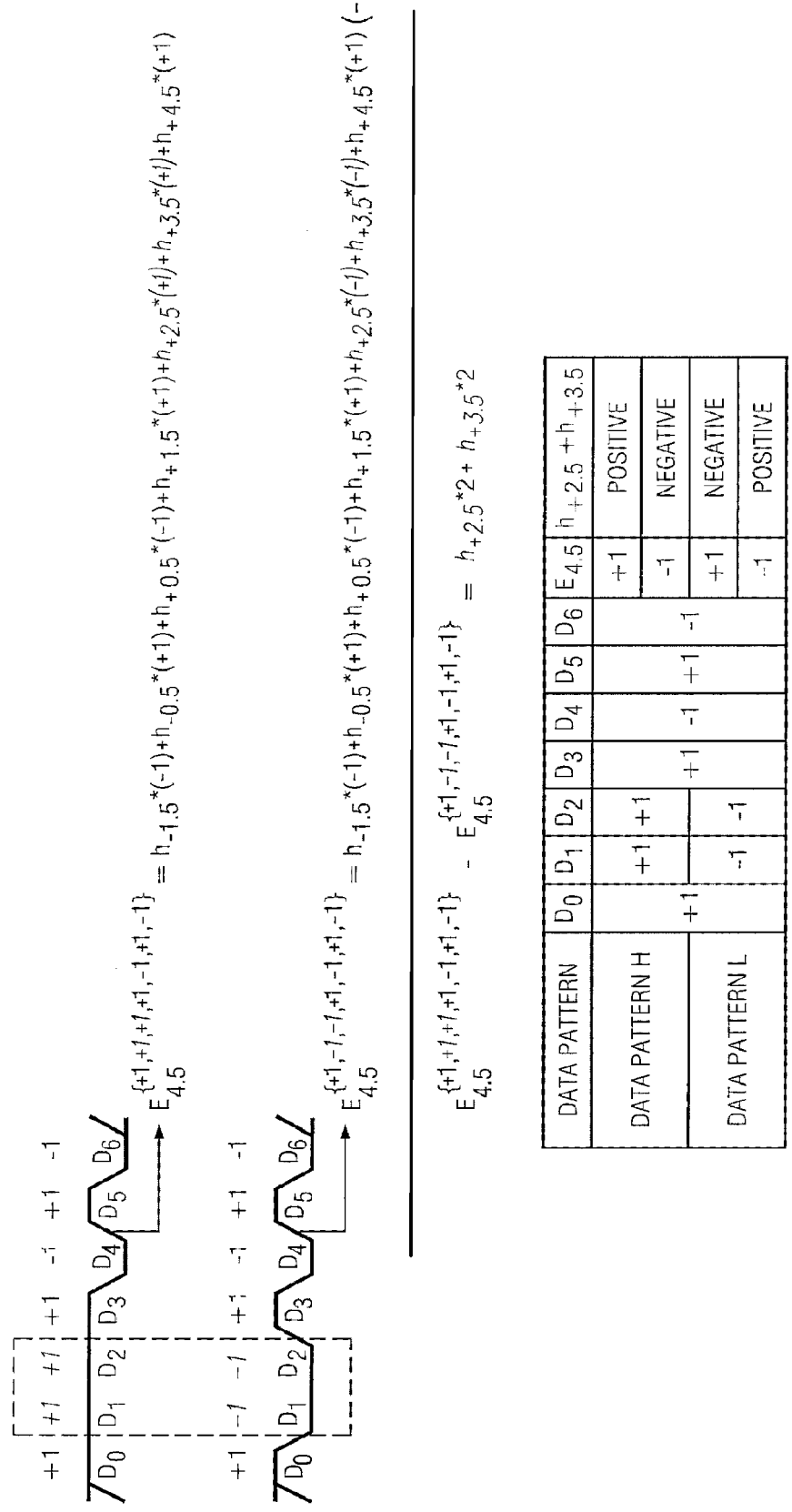
FIG. 12 illustrates example aggregate detection of residual boundary ISI using two data sequences.

In particular embodiments, the above scheme may be extended to detect two or more components of residual ISI in an aggregate manner. In particular embodiments, this aggregate detection scheme uses two data patterns which have different data values in the data bits corresponding to the residual ISI components to be measured in an aggregate manner. For example, $h_{+2.5}$ and $h_{+3.5}$ may be detected together as shown in FIG. 12. Aggregate residual boundary ISI ($h_{+2.5}*2 + h_{+3.5}*2$) is measured by taking a difference in boundary values $E_{4.5}$ between two data sequences which have different data values in the data bits corresponding to data bits $D_1$ and $D_2$. Data values $D_0$, $D_3$, $D_4$, $D_5$ and $D_6$ are the same for both data sequences. Aggregate detection of two or more components of residual ISI may be especially useful where various types of data sequences are not observed during adaptation. Aggregate detection of two or more components of residual ISI may also be especially useful for detecting components of residual ISI with more than a certain amount of delay because there is no discrete control over component residual ISI by an LE and because a sum of component residual ISIs may be sufficient for adaptive control of an LE.

Figure 13:
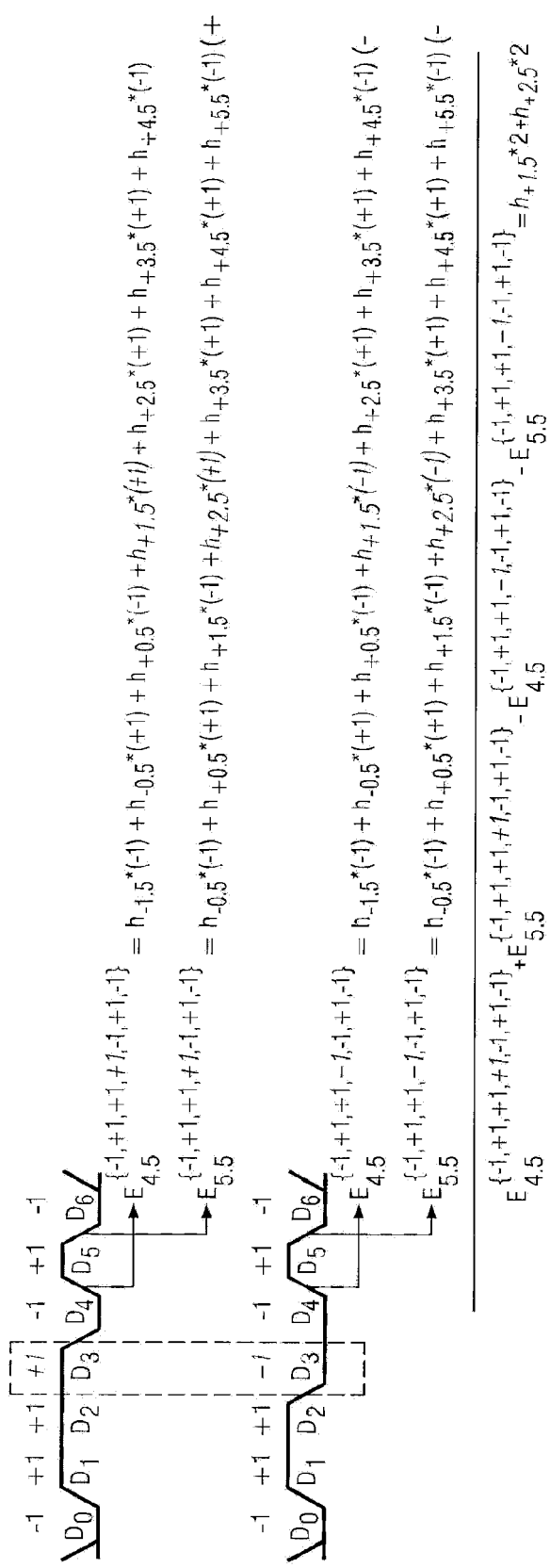
FIG. 13 illustrates example aggregate detection of residual boundary ISI using two successive transitions.

FIG. 13 illustrates example detection of two or more components of residual ISI in an aggregate manner. This aggregate detection scheme uses two data patterns and is based on the boundary values between two successive transitions, where the transitions occur at substantially the same time for both data patterns. In particular embodiments, two data sequences have different values only at one data bit $D_3$, and two successive boundary values at $E_{4.5}$ and $E_{5.5}$ are detected at substantially the same time. The aggregate residual boundary ISI $h_{+1.5}$ and $h_{+2.5}$ are detected when both $E_{4.5}$ and $E_{5.5}$ are positive or negative. When $E_{4.5}$ and $E_{5.5}$ have different values, it may indicate phase error. In particular embodiments, when $E_{4.5}$ and $E_{5.5}$ have different values, detection is skipped altogether instead of separately detecting $h_{+1.5}$ from $E_{4.5}$ and $h_{+2.5}$ from $E_{5.5}$. By skipping detection in this scenario, the detection of residual boundary ISI may become more robust for jitter.

FIG. 14 illustrates example sets of data sequences (or patterns) for detecting an individual residual boundary ISI component. In particular embodiments, it may be advantageous to switch between more than one set of data patterns which detect the same one or more components of residual ISI. Those multiple sets may be used in sequence or in random order. For example, the residual ISI of $h_{+2.5}$ may be detected by either set of data patterns shown in FIG. 14. In the illustrated embodiment, all values are inverted between pattern set R and pattern set F. In particular embodiments, using pattern set R and F alternatively or randomly reduces the effect of residual offset on residual ISI detection. In particular embodiments, it may be also advantageous to switch between one set of data patterns starting at an even bit and another set of data patterns starting at an odd bit. In particular embodiments, balancing the use of data patterns starting at an even bit and data patterns starting at an odd bit reduces the effect of duty-cycle distortion on residual ISI detection. In particular embodiments, when detecting an individual residual ISI component using two data patterns, steps may be taken to balance the effect of operations between residual ISI components (and optionally between equalizer control variables).

Figure 15:
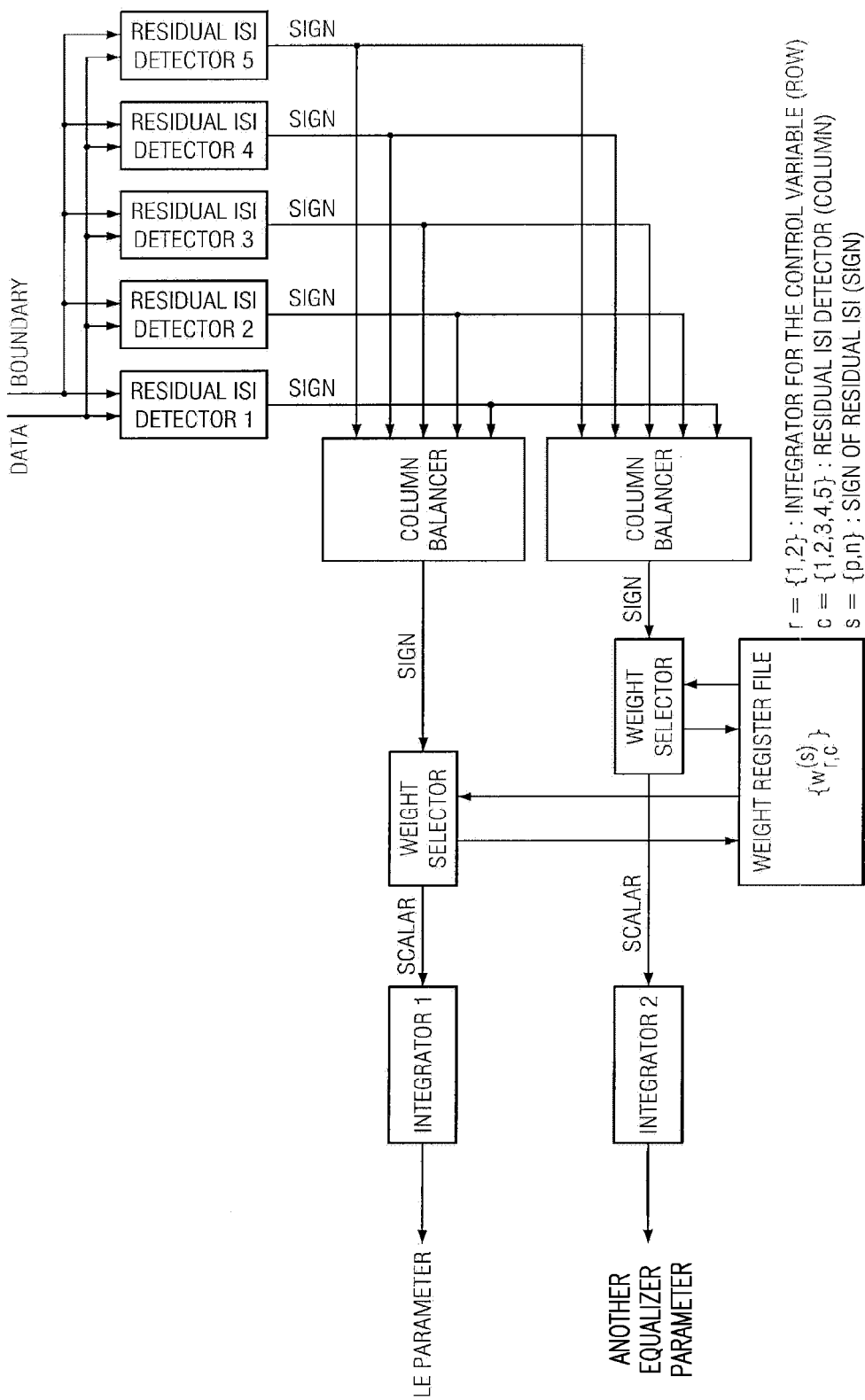
FIG. 15 illustrates example equalizer-control logic using an example sign-based method.

FIG. 15 illustrates example equalizer-control logic using an example sign-based method. The example equalizer-control logic uses a sign-based method to implement a modified General Zero-Forcing or Gauss-Newton algorithm that realizes the same or similar results. In particular embodiments, the sign-based method of FIG. 15 is configured to achieve statistically equivalent results to the results of the General Zero-Forcing or Gauss-Newton algorithm in a long term. The description above with respect to FIG. 3 further describes equalizer-control logic using a conventional General Zero-Forcing method for adaptive equalizer control and an example sign-based General Zero-Forcing method for adaptive equalizer control. The sign-based method does not measure the quantity of residual ISI. The sign-based method uses sign of residual ISI in a binary form and performs scalar and arithmetic operations instead of matrix multiply and vector operations. Residual ISI detectors 1 through 5 detect sign of residual ISI using the sign-based method. Residual ISI detectors 1 through 5 may switch between multiple sets of data patterns. Each residual ISI detector may be programmed to detect residual ISI using any data patterns, data sequences or sets of data patterns or data sequences in any format. Each residual ISI detector may utilize and switch between any interface modes and applications of adaptive control actions and operate during and switch between any periods of operation, such as during initialization, after initialization, and in use, because there may be different requirements such as available data patterns for adaptation and desired (or required) level of optimization. The sign-based method is more efficient and requires less hardware than adaptive control using conventional General Zero-Forcing or Gauss-Newton algorithms that measure quantity of residual ISI and perform matrix multiplication and vector operations. The sign-based method adds or subtracts weight to the control variable depending on the sign of residual ISI. In the sign-based method, magnitude of $W^{(p)}$ and $W^{(n)}$ are equivalent, and thus particular embodiments of the sign-based method do not use a target ISI vector. In particular embodiments, weight may be calculated from a derivative of the average of the binary residual ISI for the worst-case channel with respect to the equalizer control variable. In particular embodiments, the sign-based method balances the effect of operations between residual ISI components (and optionally between equalizer control variables). In particular embodiments, the sign-based method may be implemented by any equalizer, including any two-dimensional equalizer, any DFE and any LE, such as a continuous-time linear equalizer (CTLE) for any equalizer parameter.

Figure 16:
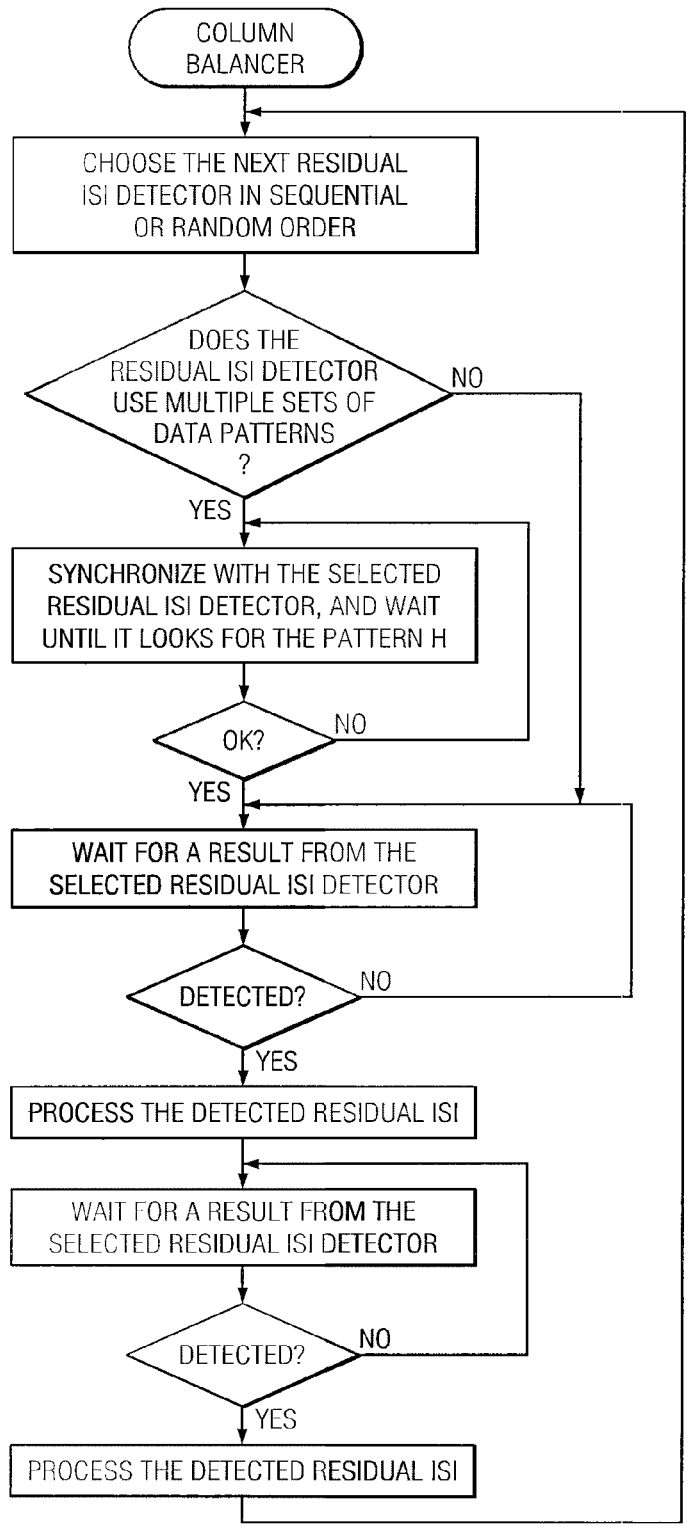
FIG. 16 illustrates example operation of an example column balancer.

FIG. 16 illustrates example operation of an example column balancer. The column balancer selects one residual ISI detector at a time, and processes two results (i.e., one for data pattern H and another for data pattern L in FIG. 10) from the selected residual ISI detector. If the residual ISI detector uses multiple sets of data patterns, it first synchronizes with the residual ISI detector after selection of the residual ISI detector so that the two results being processed are for the same set of data patterns. Synchronization may be done by waiting until the residual ISI detector is looking for the data pattern H (the first data pattern). After the column balancer processes two results from the selected residual ISI detector, the column balancer selects a next residual ISI detector in sequence or at random. In particular embodiments, in a long term, the column balancer guarantees that results from each residual ISI detector are taken into account for the same number of times. This is guaranteed for any incoming data sequence, even if data patterns for one residual ISI detector are quite often, whereas data patterns for another residual ISI detector are very rare.

As illustrated in FIG. 15, in particular embodiments, when a residual ISI detector selected by the column balancer detects residual ISI, the weight selector reads out a weight value from a three dimensional weight register file indexed by the integrator (row), the residual ISI detector (column), and the sign of detected residual ISI (sign). Then, the weight value is integrated to generate the value of the control variable, which is either the LE parameter or another equalizer parameter. The weight register file may be programmed to include information equivalent to the adaptation matrix and the target ISI vector, of which FIG. 3 illustrates examples. In particular embodiments, an adaptation matrix M and an optional target ISI vector v may be defined in FIG. 3 as follows:

$$M = \begin{Bmatrix} m_{1,1} & m_{1,2} & m_{1,3} & m_{1,4} & m_{1,5} \\ m_{2,1} & m_{2,2} & m_{2,3} & m_{2,4} & m_{2,5} \end{Bmatrix}$$

$$v = \{v_1 \quad v_2 \quad v_3 \quad v_4 \quad v_5\}^t$$

To generate results that are equivalent to those generated using the adaptation matrix M and the optional target ISI vector v in FIG. 3, the three dimensional weight register file indexed by the integrator (row), the residual ISI detector (column), and the sign of detected residual ISI (sign) in FIG. 15 may be programmed as follows:

$$W^{(p)} = \begin{Bmatrix} w_{1,1}^{(p)} & w_{1,2}^{(p)} & w_{1,3}^{(p)} & w_{1,4}^{(p)} & w_{1,5}^{(p)} \\ w_{2,1}^{(p)} & w_{2,2}^{(p)} & w_{2,3}^{(p)} & w_{2,4}^{(p)} & w_{2,5}^{(p)} \end{Bmatrix}$$

$$W^{(n)} = \begin{Bmatrix} w_{1,1}^{(n)} & w_{1,2}^{(n)} & w_{1,3}^{(n)} & w_{1,4}^{(n)} & w_{1,5}^{(n)} \\ w_{2,1}^{(n)} & w_{2,2}^{(n)} & w_{2,3}^{(n)} & w_{2,4}^{(n)} & w_{2,5}^{(n)} \end{Bmatrix}$$

$$w_{r,c}^{(p)} = +K \times m_{r,c} \times (1 - v_c)$$

$$w_{r,c}^{(n)} = -K \times m_{r,c} \times (1 + v_c)$$

In this example, $W^{(p)}$ is the weight matrix for positive residual ISI, $W^{(n)}$ is the weight matrix for negative residual ISI, and K is an arbitrary small positive number (0<K<<1).

The following shows how these are equivalent. First, assume that a residual ISI detector c generates $N_c^{(p)}$ positive results and $N_c^{(n)}$ negative results in N times of residual ISI detection by the residual ISI detector c. In particular embodiments, N is a large positive integer.

$$N_c^{(p)} + N_c^{(n)} = N$$

Then, the residual ISI vector q of which an example is illustrated in FIG. 3 is expressed as follows:

$$q = \{q_1 \quad q_2 \quad q_3 \quad q_4 \quad q_5\}^t$$

$$q_c = \frac{N_c^{(p)} - N_c^{(n)}}{N}$$

The error vector e and the update vector u in FIG. 3 may be expressed, for example, as follows:

$$e = \{e_1 \quad e_2 \quad e_3 \quad e_4 \quad e_5\}^t$$
$$= q - v$$

$$e_c = q_c - v_c$$
$$= \frac{N_c^{(p)} - N_c^{(n)}}{N} - v_c$$

$$u = \{u_1 \quad u_2\}^t$$
$$= M \times e$$
$$= M \times (q - v)$$

$$u_r = \sum_{c=1}^{5} m_{r,c} \times e_c$$
$$= \sum_{c=1}^{5} m_{r,c} \times \left(\frac{N_c^{(p)} - N_c^{(n)}}{N} - v_c\right)$$

The cumulative sum of weights for the integrator r in FIG. 15 while N results are processed for each residual ISI detector may be expressed, for example, as:

$$\hat{u}_r = \sum_{c=1}^{5} w_{r,c}^{(p)} \times N_c^{(p)} + w_{r,c}^{(n)} \times N_c^{(n)}$$
$$= \sum_{c=1}^{5} K \times m_{r,c} \times \{(1 - v_c) \times N_c^{(p)} - (1 + v_c) \times N_c^{(n)}\}$$
$$= \sum_{c=1}^{5} K \times m_{r,c} \times \{N_c^{(p)} - N_c^{(n)} - v_c \times (N_c^{(p)} + N_c^{(n)})\}$$
$$= \sum_{c=1}^{5} K \times m_{r,c} \times \{N_c^{(p)} - N_c^{(n)} - v_c \times N\}$$
$$= KN \sum_{c=1}^{5} m_{r,c} \times \left(\frac{N_c^{(p)} - N_c^{(n)}}{N} - v_c\right)$$
$$= KN \times u_r$$

These two systems are equivalent when $$N = \frac{1}{K}.$$

Since K is a small positive number, a large number N which makes two systems statistically equivalent exists.

In particular embodiments, the target ISI vector v is zero and not used, indicating that $W^{(p)} = -W^{(n)}$ and the difference between these weight matrices is zero and need not be recorded. The amount of hardware may be reduced, for example, by using a 2-dimensional weight register file which holds a value of $W = W^{(p)} = -W^{(n)}$, and selecting addition or subtraction by the sign of detected residual ISI. Weight may be calculated from a derivative of the average of the binary residual ISI for the worst-case channel with respect to the equalizer control variable. In particular embodiments, the sign-based method balances the effect of operations between residual ISI components (and optionally between equalizer control variables).

In particular embodiments, $W^{(p)}$ and $W^{(n)}$ have different magnitudes and the magnitudes may be recorded in a 3-dimensional register file in order to implement the optional target ISI vector v. First, an optional target ISI vector v may be selected based on the average of the binary observation variable in the target state for the worst case. Second, an adaptation matrix M may be calculated from a derivative of the average of the binary observation variable with respect to the control variable in the target state for the worst case. Third, weight matrices of $W^{(p)}$ and $W^{(n)}$ may be calculated from the optional target ISI vector v and the adaptation matrix M with a small loop constant K according to the above formulas. These parameters minimizes squares of difference between the average of the binary observation variable and the optional target ISI vector in the equilibrium state for the worst case.

In particular embodiments, the amount of increase (or decrease) applied to a binary observation variable is equivalent, and the average of a particular binary observation variable is zero in the equilibrium state. U.S. Patent Application Publication No. 2007/0280389, entitled System and Method for Asymmetrically Adjusting Compensation Applied to a Signal and published 6 Dec. 2007, which is incorporated herein by reference, discloses changing the equilibrium state from such a state to a next state where the average of the binary observation variable is a non-zero target value. For example, where there is a single control variable and a single binary observation variable and amount of increase and decrease of the control variable according to the binary observation variable is different, the average of the binary observation variable converges to the non-zero target value in the equilibrium state.

In particular embodiments, where there are single or multiple control variables and multiple binary observation variables, the number of binary observation variables is larger than the number of control variables. In particular embodiments, where the amount of increase and decrease is equivalent, the sum of the squares of the average of each binary observation variable is minimized in the equilibrium state for a certain condition. In particular embodiments, where the amount of increase and decrease is different, the equilibrium state is changed from such a state to a next state where the sum of the squares of the difference between the average of each binary observation variable and a target value of the observation variable is minimized for the certain condition. Particular embodiments including single or multiple equalizer control variables and multiple binary observation variables balance the effect of operations between binary observation variables (and optionally between equalizer control variables). Herein, reference to "equalizer control variables" may encompass equalizer parameters, and vice versa, where appropriate.

Figure 17:
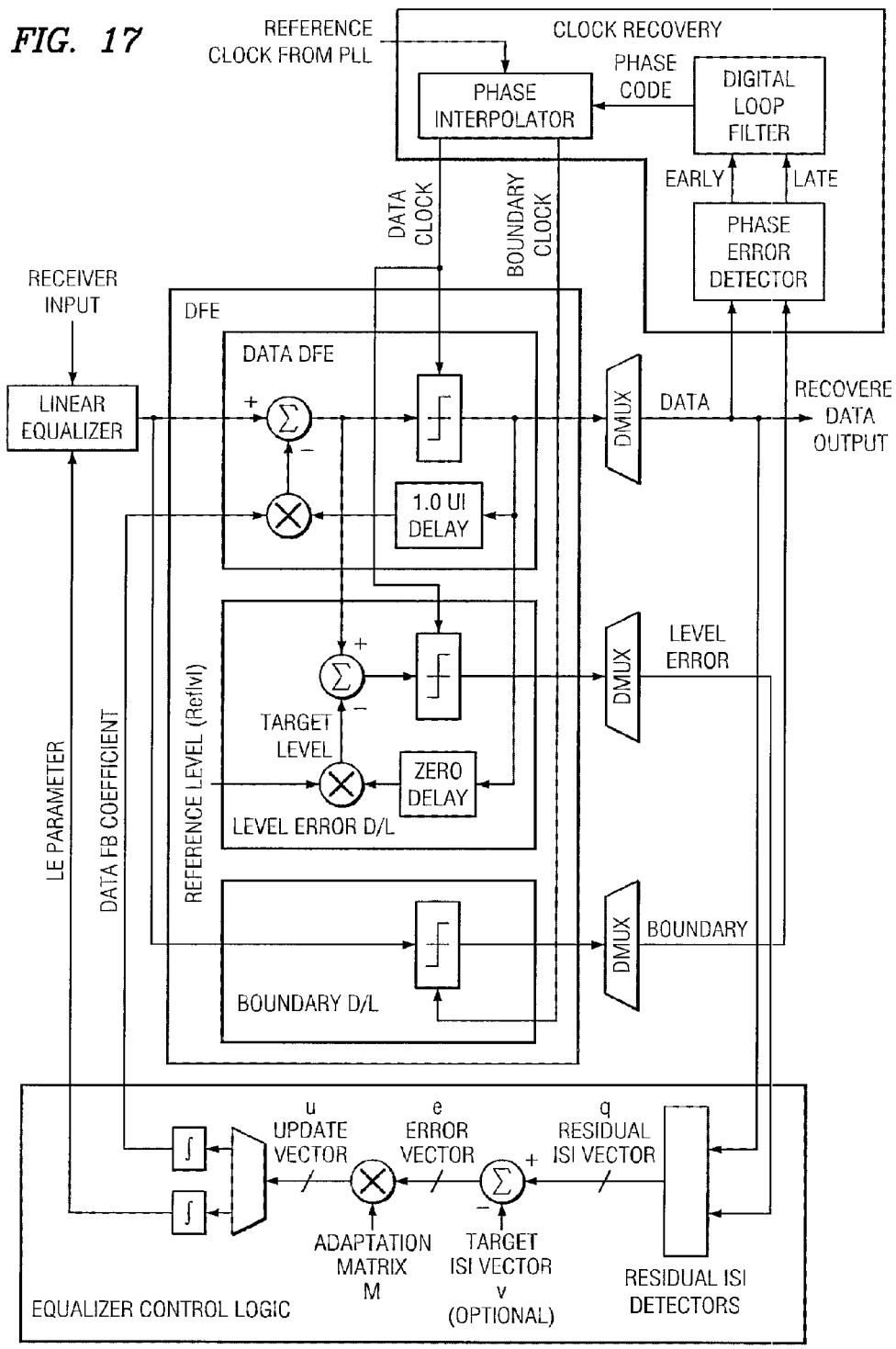
FIG. 17 illustrates example adaptive equalizer control based on example level error.

FIG. 17 illustrates example adaptive equalizer control based on example level error. Amplitude error ("reference-level error" or "level-error") is used instead of the boundary value for adaptive control. The level-error decision latch (D/L) subtracts a target level, which is the product of a data value and a reference level from the pre-decision level of the data DFE, and produces a sign of level-error, either +1 or −1. In particular embodiments, the level-error D/L may use a speculative or loop-unrolling technique similar to FIG. 5, for example, to solve the timing constraint. In particular embodiments, the level-error D/L uses a time multiplexing technique to decrease hardware resources, which may be increased by unrolling feedback loops.

Figure 18:
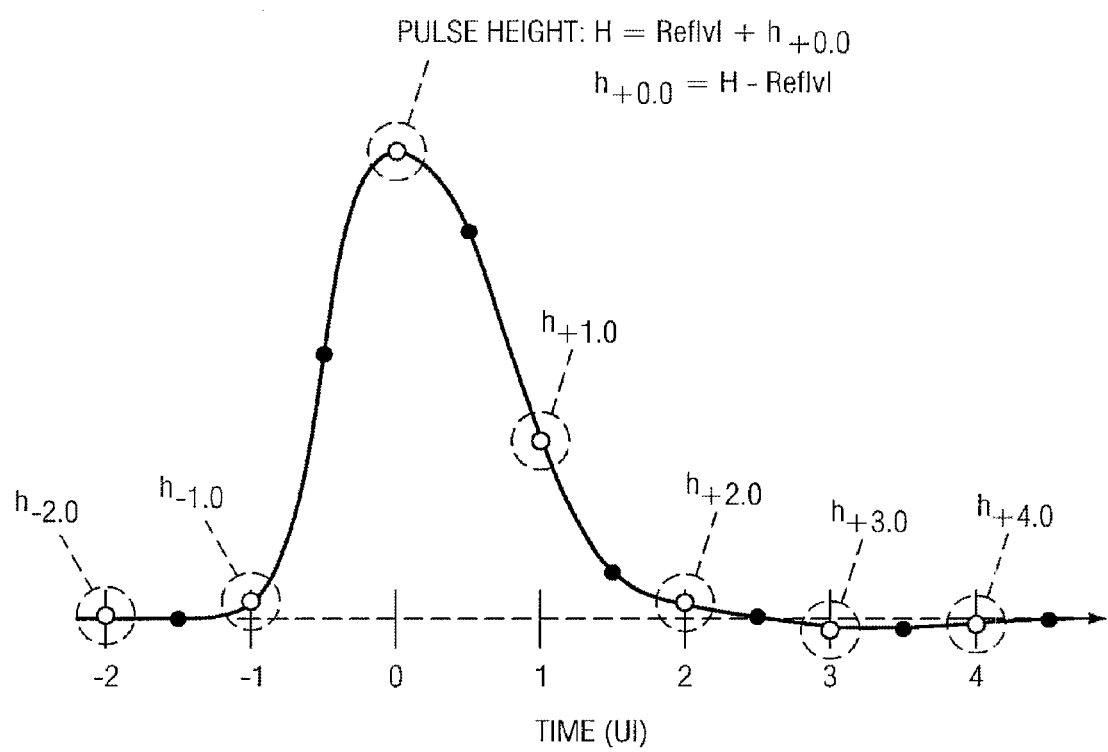
FIG. 18 illustrates example residual data ISI in an example pulse response at an output of an example LE.
Figure 19:
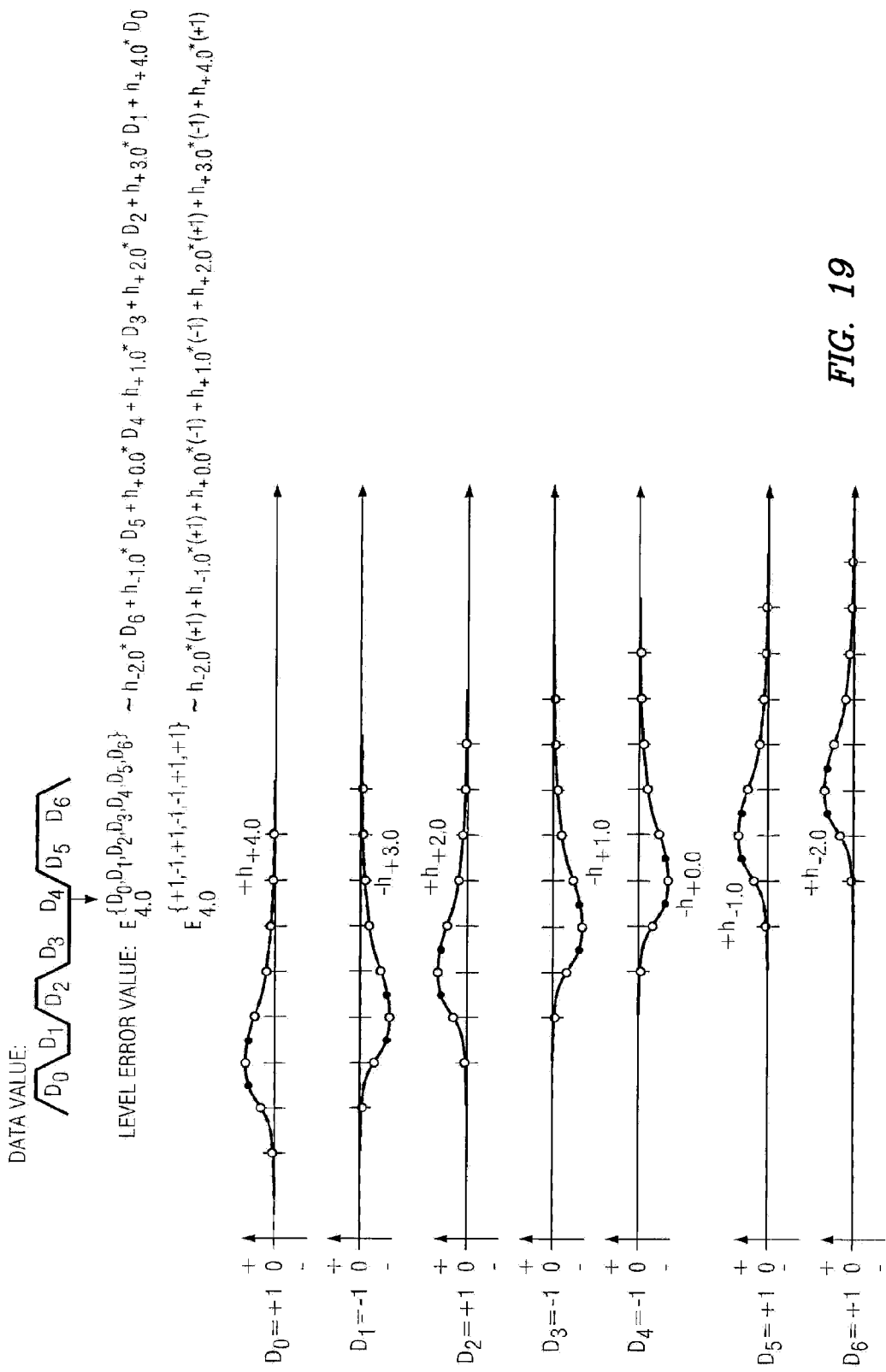
FIG. 19 illustrates example convolution of example residual data ISI and an example data sequence.

FIG. 18 illustrates example residual data ISI in an example pulse response at an output of an example LE. The residual data ISI at time zero ($h_{+0.0}$) represents the difference of the pulse height at time zero (H) and the reference level (Reflvl). At all other times, for example, at the other times illustrated, the residual data ISI is the same as the pulse response level. As described with respect to FIG. 8, a boundary value may be represented as a convolution of residual boundary ISI and a data sequence. Similarly, a data value may be represented as a convolution of residual data ISI and a data sequence. FIG. 19 illustrates example convolution of example residual data ISI and an example data sequence. In particular embodiments, when receiving a continuous data sequence, level-error seen by the decision circuit in the level-error D/L is represented as a convolution of residual data ISI and the data sequence as shown in FIG. 19.

Figure 20:
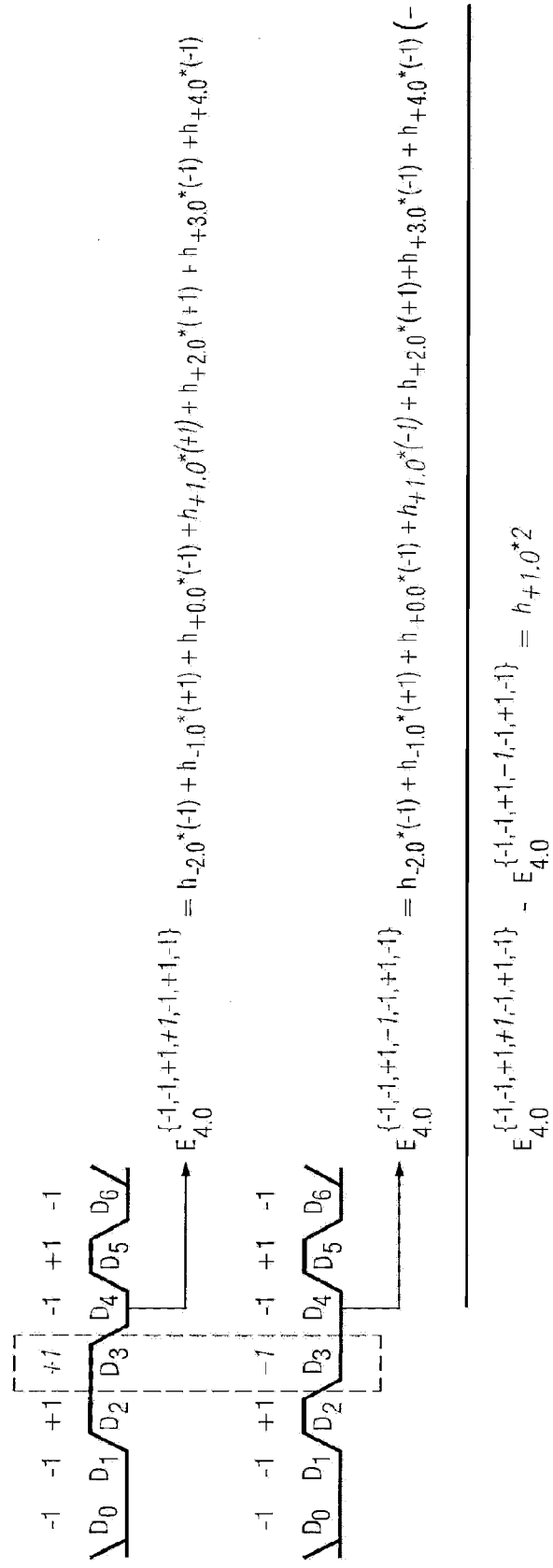
FIG. 20 illustrates example detection of residual data ISI based on one or more differences in level-error values between two data sequences.

FIG. 20 illustrates example detection of residual data ISI based on one or more differences in level-error values between two data sequences. As illustrated, $h_{+1.0}$ is measured by taking a difference in the level-error values at $D_4$ for two data sequences which have different values at $D_3$. Residual data ISI may be measured by taking a difference in the level-error values for two data sequences which have different values in the data bits corresponding to the residual data ISI to be measured. While level-error values may be measured as full-range precision analog level, the illustrated embodiment may be used to measure residual data ISI, including the sign and magnitude to some extent of the residual data ISI, using only binary level-error values, either +1 or −1, instead of precision analog levels. The statistical difference between the binary level-error values for the two data sequences may be used to measure the sign and magnitude to some extent of the residual data ISI as long as the binary level-error values are not statistically saturated. For example, the probabilities of positive ("+1") level-error values are exactly same for the two data sequence in FIG. 20, if and only if the residual data ISI $h_{+1.0}$ is absolutely zero. As another example, the probabilities of negative ("−1") level-error values are exactly same for the two data sequence in FIG. 20, if and only if the residual data ISI $h_{+1.0}$ is absolutely zero. If the residual data ISI at $h_{+1.0}$ is not zero, the probability of positive (or negative) level-error value is higher (or lower) for the data sequence with $D_3=+1$ than $D_3=-1$, depending on whether the residual data ISI $h_{+1.0}$ is positive or negative. The amount of statistical difference indicates the magnitude of the residual data ISI $h_{+1.0}$.

The detection of residual boundary ISI as described and illustrated by the present disclosure with respect to particular embodiments may be applicable to detecting residual data ISI or level-error values, where appropriate. The detection of residual data ISI or level-error values as described and illustrated by the present disclosure with respect to particular embodiments may be applicable to detecting residual boundary ISI. Although the present disclosure describes two-dimensional control for one parameter LE and one tap DFE, the present disclosure contemplates any suitable adaptive control of any suitable number of any suitable parameters of (for example) continuous-time LEs, multi-tap DFEs or multi-tap FIR filters, or pre-emphasis parameters using multi-tap FIR filters.

An adaptive equalizer control system may include any suitable type of memory. The memory may be used to store phase delay settings, phase codes, target level-error values, target residual boundary and data ISI values, adaptation matrix, rows, columns, signs, parameters, input signals, output signals. Such values may correspond to user or administrator specified values that may be entered into a database that may be accessed by the memory.

As an example and not by way of limitation, an adaptive equalizer control system may provide functionality as a result of a processor executing software embodied in one or more tangible, computer-readable media, such as a memory. A computer-readable medium may include one or more memory devices, according to particular needs. Main memory may read the software from one or more other computer-readable media, such as mass storage device or from one or more other sources via communication interface. The software may cause processor to execute particular processes or particular steps of particular processes described herein. In addition or as an alternative, the computer system may provide functionality as a result of logic hardwired or otherwise embodied in a circuit, which may operate in place of or together with software to execute particular processes or particular steps of particular processes described herein. Reference to software may encompass logic, and vice versa, where appropriate. Reference to a computer-readable media may encompass a circuit (such as an integrated circuit ("IC")) storing software for execution, a circuit embodying logic for execution, or both, where appropriate. The present disclosure encompasses any suitable combination of hardware and software.

Figure 21:
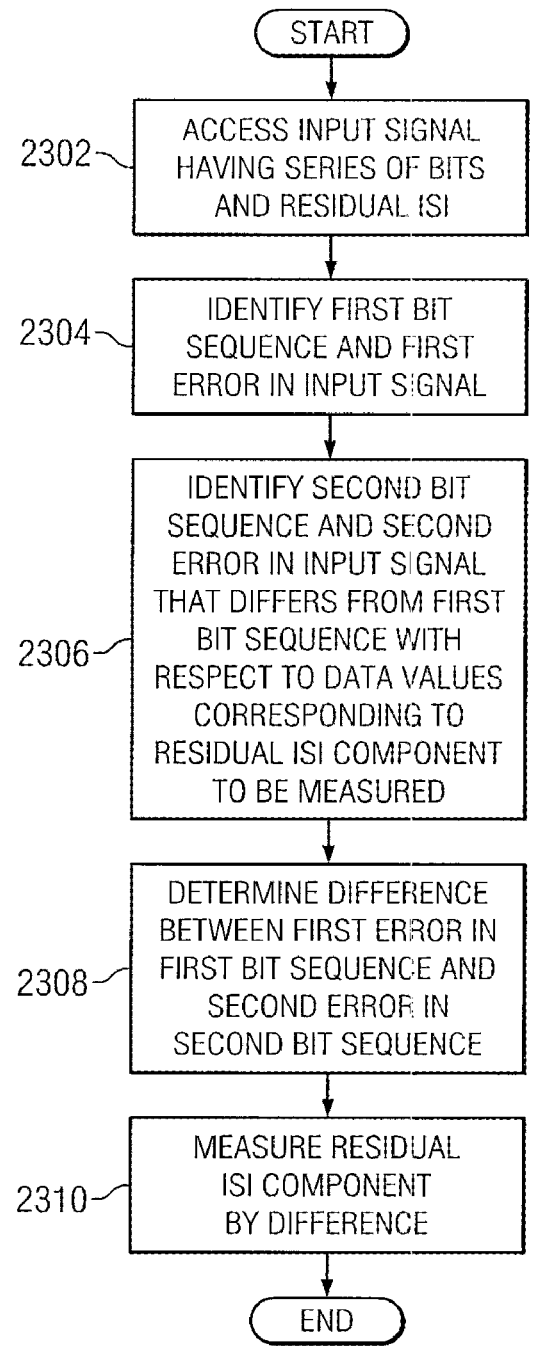
FIG. 21 illustrates an example method for detecting residual ISI components using two data patterns.

FIG. 21 illustrates an example method 2300 for detecting residual ISI components using two data patterns. The method begins at step 2302, where one or more circuit components access an input signal from a receiver. In particular embodiments, the input signal includes a series of bits and residual ISI. At step 2304, the circuit components identify a first bit sequence and a first error associated with the first bit sequence in the input signal. At step 2306, the circuit components identify a second bit sequence and a second error associated with the second bit sequence in the input signal that differs from the first bit sequence with respect to one or more data values of one or more bits in the first and second bit sequences. The one or more data values correspond to particular residual ISI for measurement. At step 2308, the circuit components determine a difference between the first error associated with the first bit sequence and the second error associated with the second bit sequence. At step 2310, the circuit components measure the particular residual ISI by the difference, at which point the method ends. Particular embodiments use the particular residual ISI measurement for adaptive equalizer control. Particular embodiments may continuously repeat the steps of the method of FIG. 21 according to particular needs. Although the present disclosure describes and illustrates particular steps of the method of FIG. 21 as occurring in a particular order, the present disclosure contemplates any suitable steps of the method of FIG. 21 occurring in any suitable order. Although the present disclosure describes and illustrates particular components carrying out particular steps of the method of FIG. 21, the present disclosure contemplates any suitable components carrying out any suitable steps of the method of FIG. 21.

Figure 22:
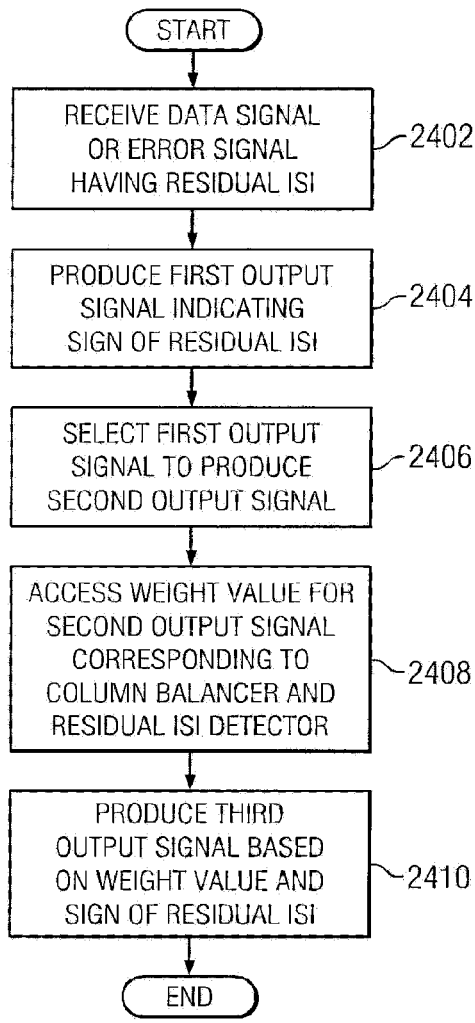
FIG. 22 illustrates an example method for sign-based general zero-forcing adaptive equalizer control.

FIG. 22 illustrates an example method for sign-based general zero-forcing adaptive equalizer control. The method begins at step 2402, where one or more residual ISI detectors receive from a DFE a data signal or an error signal comprising residual ISI. At step 2404, the residual ISI detector produces a first output signal indicating whether the residual ISI has a positive sign or a negative sign. At step 2406, one or more column balancers select from among the first output signals one of the first output signals to produce a second output signal. At step 2408, one or more weight selectors access from among multiple weight values one of the weight values for a received one of the second output signals. The accessed one of the weight values corresponds to the column balancer that produced the second output signal and the residual ISI detector that produced the selected one of the first output signals to produce the second output signal. The accessed one of the weight values has a magnitude that is substantially independent of the sign of the residual ISI indicated by the selected one of the first output signals to produce the second output signal. At step 2410, the weight selector produces a third output signal based on the accessed one of the weight values and the sign of the residual ISI indicated by the selected one of the first output signals, at which point the method ends. Particular embodiments use the third signal to produce one or more fourth output signals representing one or more control variables for one or more equalizers. Particular embodiments may continuously repeat the steps of the method of FIG. 22, according to particular needs. Although the present disclosure describes and illustrates particular steps of the method of FIG. 22 as occurring in a particular order, the present disclosure contemplates any suitable steps of the method of FIG. 22 occurring in any suitable order. Although the present disclosure describes and illustrates particular components carrying out particular steps of the method of FIG. 22, the present disclosure contemplates any suitable components carrying out any suitable steps of the method of FIG. 22.

Figure 23:
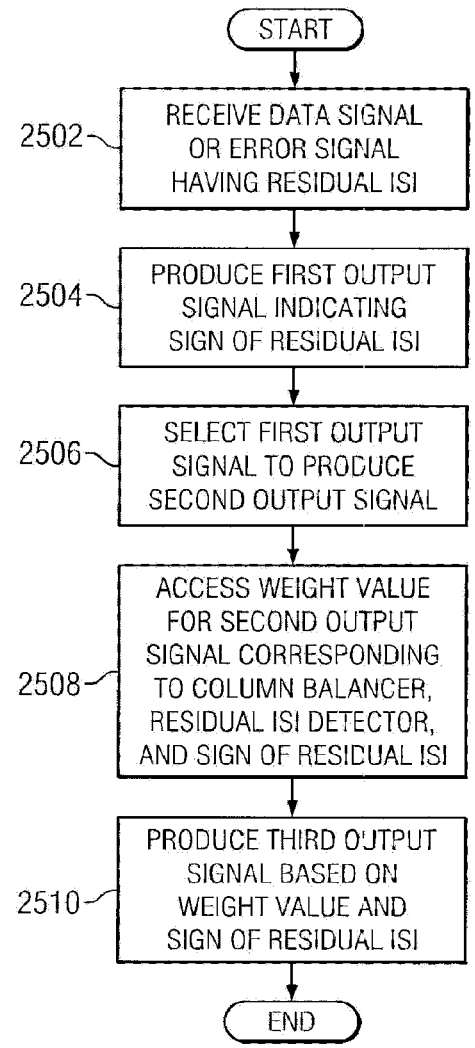
FIG. 23 illustrates an example method for multidimensional asymmetric bang-bang control.

FIG. 23 illustrates an example method for multidimensional asymmetric bang-bang control. The method begins at step 2502, where one or more residual ISI detectors receive from a DFE a data signal or an error signal comprising residual ISI. At step 2504, the one or more residual ISI detectors produce a first output signal indicating whether the residual ISI has a positive sign or a negative sign. At step 2506, the one or more column balancers select from among the first output signals one of the first output signals to produce a second output signal. At step 2508, one or more weight selectors access from among multiple weight values one of the weight values for a received one of the second output signals. The accessed one of the weight values corresponds to the column balancer that produced the second output signal, the residual ISI detector that produced the selected one of the first output signals to produce the second output signal, and the sign of the residual ISI indicated by the selected one of the first output signals to produce the second output signal. The accessed one of the weight values has a magnitude that depends on the sign of the residual ISI indicated by the selected one of the first output signals to produce the second output signal. At step 2510, the weight selector produces a third output signal based on the accessed one of the weight values, at which point the method ends. Particular embodiments use the third signal to produce one or more fourth output signals representing one or more control variables for one or more equalizers. Particular embodiments may continuously repeat the steps of the method of FIG. 23, according to particular needs. Although the present disclosure describes and illustrates particular steps of the method of FIG. 23 as occurring in a particular order, the present disclosure contemplates any suitable steps of the method of FIG. 23 occurring in any suitable order. Although the present disclosure describes and illustrates particular components carrying out particular steps of the method of FIG. 23, the present disclosure contemplates any suitable components carrying out any suitable steps of the method of FIG. 23.

Figure 24A:
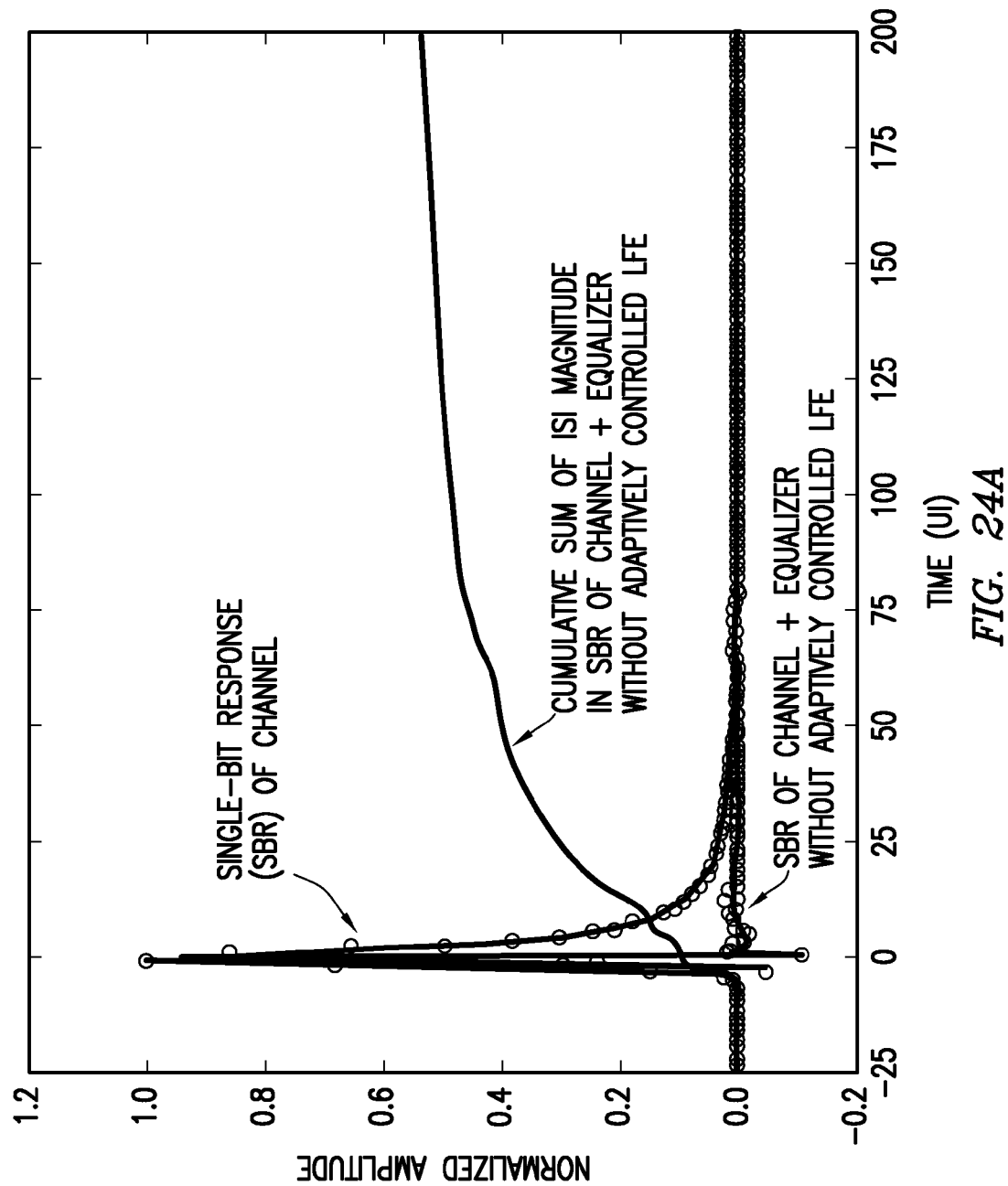
FIG. 24A illustrates example long-term residual ISI in an example pulse response at an output of an example equalizer without an adaptive low frequency equalizer ("LFE").

FIG. 24A illustrates example long-term residual ISI in an example pulse response, or single bit response, at an output of an example LE implemented by, for example, the embodiments of FIGS. 1-23. The cumulative amount of long-term residual ISI may steadily increase over time, indicating overequalization or underequalization of low frequencies. Extension of the embodiments of FIGS. 1-23 to match patterns of the long-length portions of the cumulative sum of ISI shown in FIG. 24A may not be practically feasible, because the probability of the occurrence of a given filter pattern may decrease exponentially with the increase in size of the filter pattern. For example, the probability of matching a 100-bit-long filter pattern with random sequences is 7.9E-31; given a data rate of 10 Gbps, a match while monitoring the data stream may occur every four trillion years.

Figure 24B:
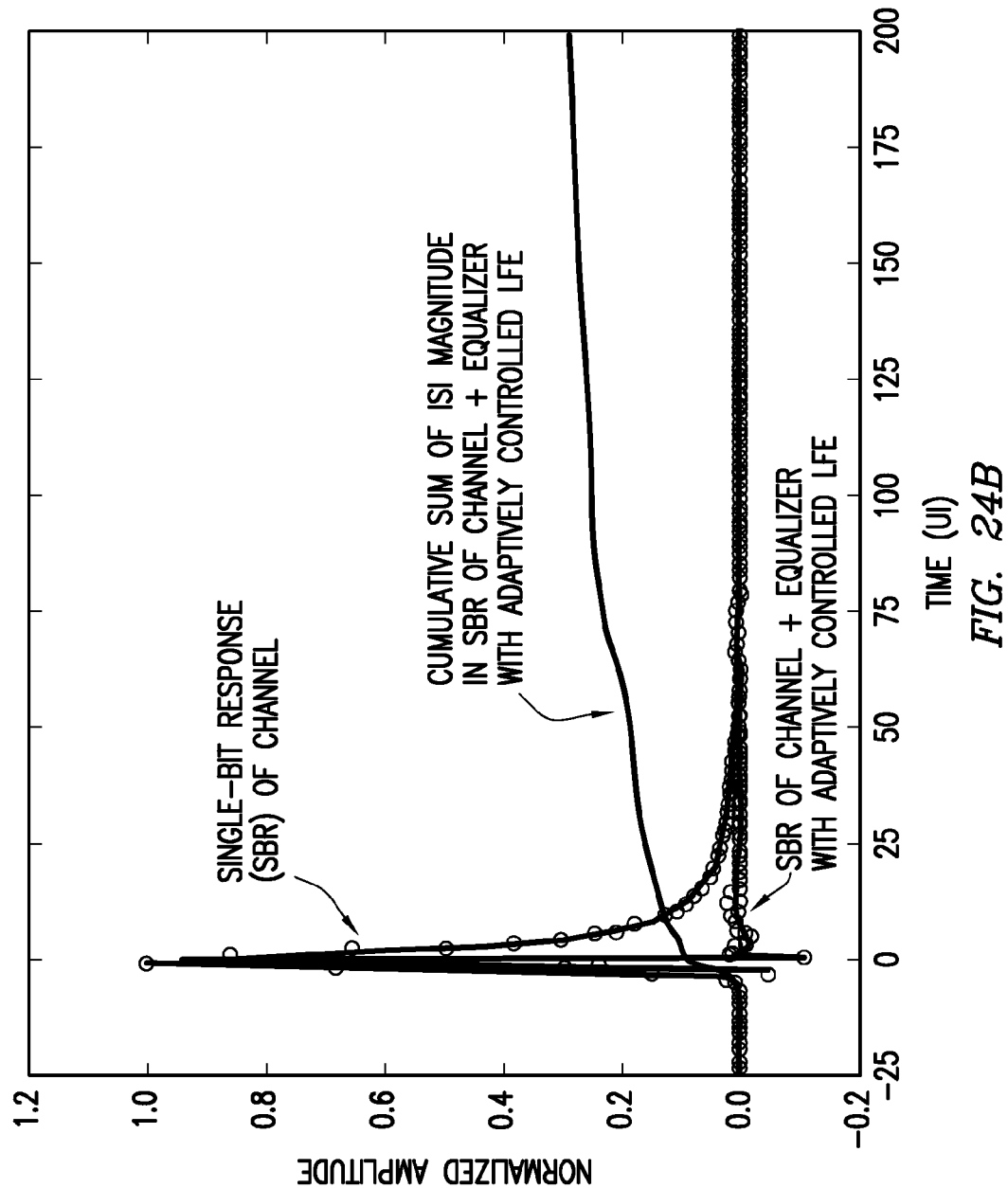
FIG. 24B illustrates example long-term residual ISI in an example pulse response at an output of an exampled equalizer with an adaptive LFE.

An equalizer system, device, or design may include an adaptively controlled low-frequency equalizer ("LFE"). Such an LFE may be configured to reduce long-term residual ISI such as that illustrated in FIG. 24B. Although sample results are provided in FIG. 24B, more or less effect may be had on the cumulative sum of residual ISI depending upon the implementation of adaptive LFE. An adaptively controlled LFE may be included within any suitable equalizer system, device, or design. In one embodiment, an existing equalizer system or design may be modified with the inclusion of a low-frequency equalizer. In another embodiment, an equalizer system or design with an existing LFE may be modified such that the LFE is adaptively controlled. In yet another embodiment, an equalizer system or design may be constructed with an adaptively controlled LFE. For example, an adaptively controlled LFE may be implemented wholly or in part in the linear equalizer in FIG. 1; the decision circuit of FIG. 2; the residual ISI detectors, DFE's, or LE of FIG. 3; or the residual ISI detectors, DFE's, or LE of FIG. 17. Furthermore, an adaptively controlled LFE may be implemented wholly or in part in, for example: equalizers utilizing a low-frequency pole-zero pair using an LPF in feed-back path; equalizers utilizing a low-frequency pole-zero pair using an LPF in feed-forward path; or equalizers utilizing decision-feedback equalizer with a low-frequency infinite-impulse-response feedback filter.

Figure 25:
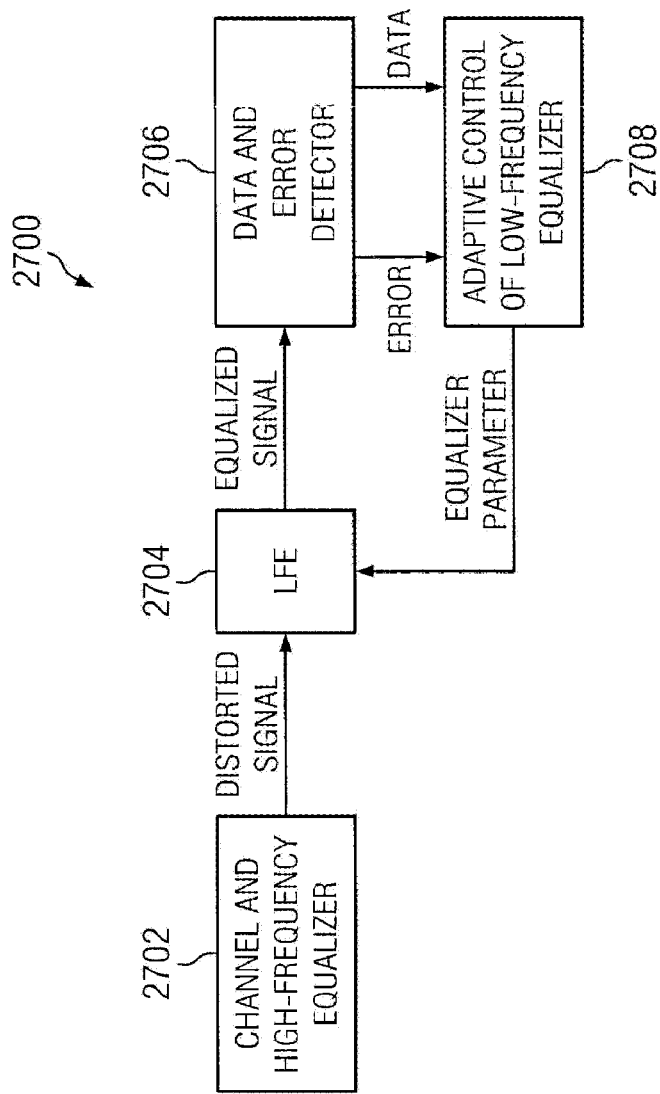
FIG. 25 is a system block diagram of an example embodiment of a system that includes an adaptive low frequency equalizer ("LFE").

FIG. 25 is a system block diagram of an example embodiment of a system 2700 that includes an adaptive LFE. In one embodiment, system 2700 may include a an adaptive low-frequency equalizer after channel and high-frequency equalizer. Channel and high-frequency equalizer 2702 may be configured to communicate a signal from a transmitter to a receiver and to moderately amplify an attenuated high-frequency component of the received signal to reduce residual ISI occurring after a particular delay. Channel and high-frequency equalizer 2702 may be implemented, for example, by the channel, LE, and 1-TAP DFE of FIG. 1. Channel and high-frequency equalizer 2702 may be communicatively coupled to an LFE 2704 and configured to transmit the distorted signal with long-term ISI. LFE 2704 may be implemented in any suitable manner, including by any suitable equalizer configured to address low frequency and accept parameters to adjust its operation. LFE 2704 may be configured to reduce low-frequency ISI. LFE 2704 may be communicatively coupled to data and error detector 2706 and configured to transmit the equalized signal. Data and error detector 2706 may be implemented in any suitable manner, including by any mechanisms to determine data and error in relation to ISI of the equalized signal. Data and error detector 2706 may be communicatively coupled to adaptive control of low frequency equalizer 2708 and to send the error and data of the equalized signal. Adaptive control of low frequency equalizer 2708 may be implemented in any suitable manner, including utilizing finite state machines to implement extended filter patterns for reducing long-term ISI. Adaptive control of low frequency equalizer 2708 may be configured to determine parameters for the operation of LFE 2704 based on filter pattern matching of received error and data information. Adaptive control of low frequency equalizer 2708 may be communicatively coupled to LFE 2704 to provide such equalizer parameters. LFE 2704 may be configured to adjust its operation based on the received equalizer parameter.

Figure 26:
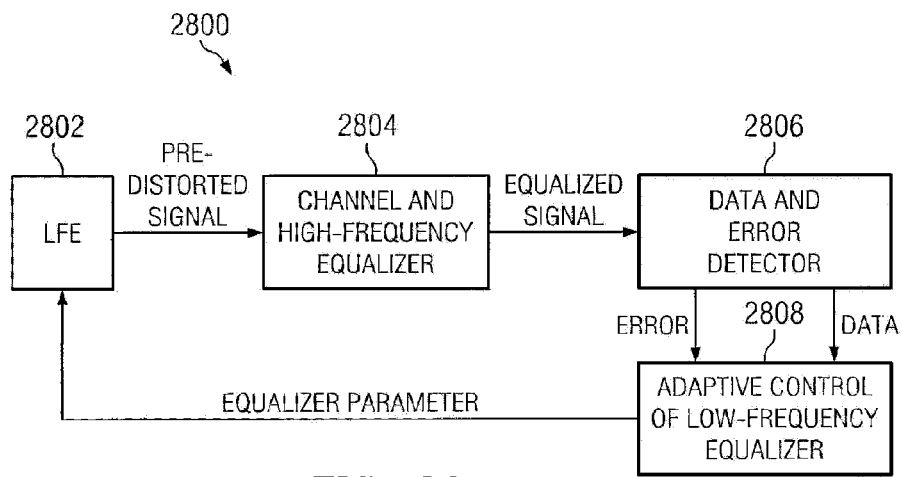
FIG. 26 is another system block diagram of an example embodiment of a system that includes an adaptive LFE.

FIG. 26 is a system block diagram of an example embodiment of a system 2800 that includes an adaptive LFE. In one embodiment, system 2800 may include an adaptive low-frequency equalizer before channel and high-frequency equalizer. Channel and high-frequency equalizer 2804 may be configured to communicate a signal from a transmitter to a receiver and to moderately amplify an attenuated high-frequency component of the received signal to reduce residual ISI occurring after a particular delay. Channel and high-frequency equalizer 2804 may be implemented, for example, wholly or in part by channel and high-frequency equalizer 2702 of FIG. 25. Channel and high-frequency equalizer 2804 may be communicatively coupled to data and error detector 2806 and configured to send the equalized signal. Data and error detector 2806 may be implemented in any suitable manner, including wholly or in part by data and error detector 2706 of FIG. 25. Data and error detector 2806 may be communicatively coupled to adaptive control of low frequency equalizer 2808 and to send the error and data of the equalized signal. Adaptive control of low frequency equalizer 2808 may be implemented in any suitable manner, including wholly or in part by adaptive control of low frequency equalizer 2708 of FIG. 25. Adaptive control of low frequency equalizer 2808 may be communicatively coupled to LFE 2802 to provide such equalizer parameters. LFE 2802 may be implemented in any suitable manner, such as wholly or in part by LFE 2704 of FIG. 25. LFE 2802 may be configured to adjust its operation based on the received equalizer parameter and to output a pre-distorted signal to channel and high-frequency equalizer 2804. Such a pre-distorted signal may be configured to adjust for long-term ISI through its adoption and use by channel and high-frequency equalizer 2804.

Figure 27:
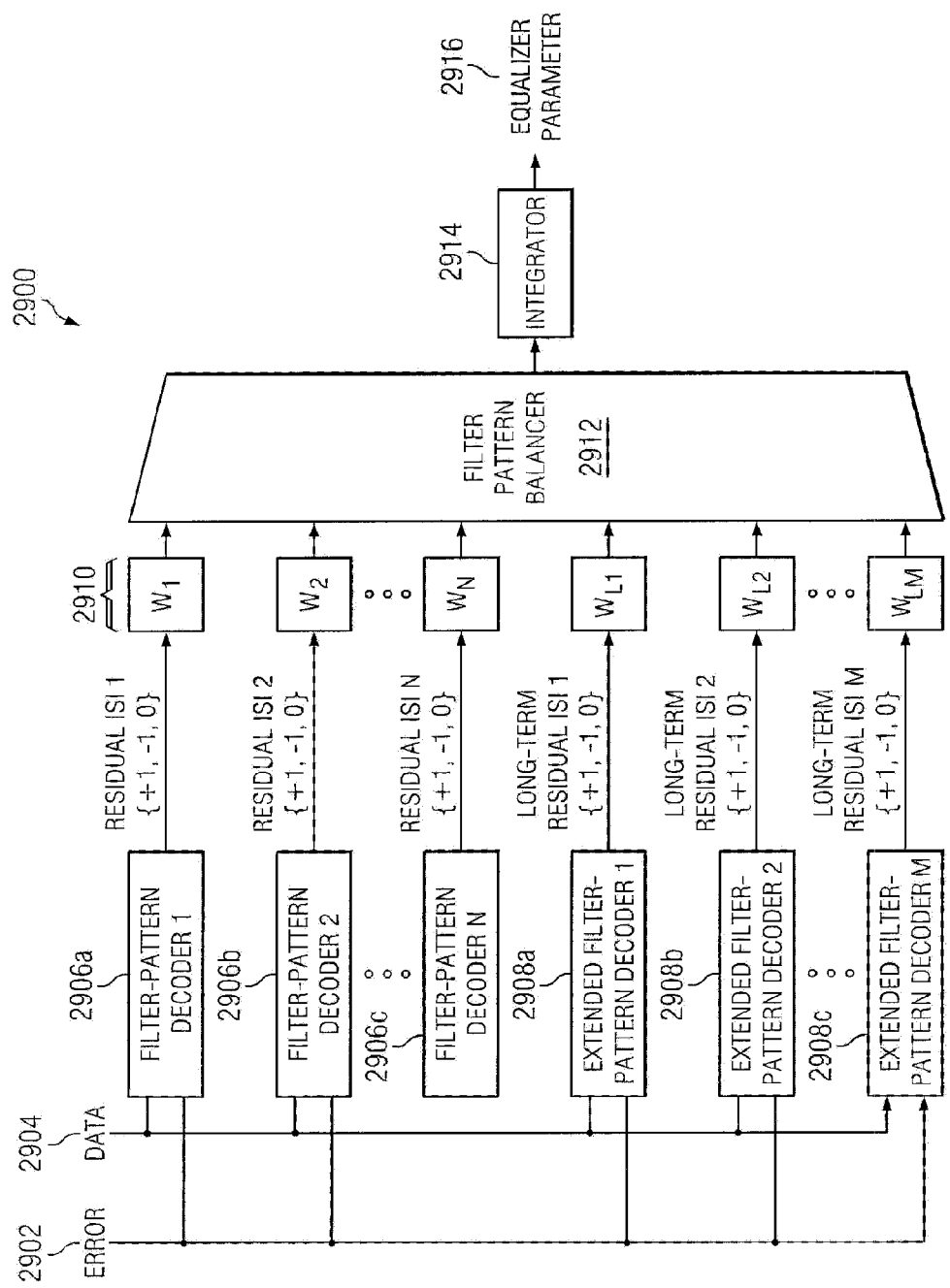
FIG. 27 is a block diagram of an example embodiment of an adaptive controller of a low frequency equalizer.

FIG. 27 is a block diagram of an example embodiment of an adaptive control 2900 of a low frequency equalizer. In one embodiment, adaptive control 2900 may be configured to utilize sign-based zero-forcing. Adaptive control 2900 may be implemented in part by one or more portions of the equalizer-control logic FIG. 15. In one embodiment, adaptive control 2900 may include enhancements or additions to the equalizer-control logic of FIG. 15. Adaptive control 2900 may implement, for example, adaptive control of low-frequency equalizer 2708 of FIG. 25, adaptive control of low-frequency equalizer 2808 of FIG. 26, or any other adaptive control for a low frequency equalizer configured to operate according to the teachings of this application.

Adaptive control 2900 may include inputs for error 2902 (also known as boundary) and for data 2904. Such error 2902 and data 2904 may be received from, for example, data and error detector 2706 of FIG. 25 or data and error detector 2806 of FIG. 26.

Adaptive control 2900 may include one or more extended filter-pattern decoders 2908. Adaptive control 2900 may include as many extended filter-pattern decoders 2908 as necessary or desirable to adequately address long-term residual ISI. Each of extended filter-pattern decoders 2908 may be configured to detect long-term residual ISI. In one embodiment, each of extended filter-pattern decoders 2908 may be configured to detect sign of residual ISI using the sign-based method. Furthermore, each of extended filter-pattern decoders 2908 may be configured to switch between multiple sets of data patterns. Each of extended filter-pattern decoders 2908 may be configured to detect long-term residual ISI using any suitable data patterns, data sequences or sets of data patterns or data sequences in any format. Example such data patterns and sequences are discussed in more detail within the context of FIGS. 29-30, below. Each of extended filter-pattern decoders 2908 may utilize and switch between any interface modes and applications of adaptive control actions and operate during and switch between any periods of operation, such as during initialization, after initialization, and in use.

Each of extended filter-pattern decoders 2908 may be configured to output a signed output corresponding to the long-term residual ISI indicating whether its input indicates that the associated LFE needs to increase or decrease its compensation of the signal for long-term ISI. In one embodiment, each of extended filter-pattern decoders 2908 may be configured to output: a "+1" if its input indicates that the associated LFE needs to increase its compensation; a "−1" if its input indicates that the associated LFE needs to decrease its compensation; and a "0" if its input does not indicate whether the associated LFE needs to decrease or increase its compensation.

Adaptive control 2900 may include one or more weights 2910 to apply to the output of extended filter-pattern decoders 2908. Weights 2910 may be configured to add or subtract a portion of the output, which may be calculated from a derivative of the average of the binary residual ISI for the worst-case channel with respect to the equalizer control variable. Use of weights 2910 may be configured to balance the effect of operations between residual ISI components and, optionally, between equalizer control variables. In one embodiment, weights 2910 may be implemented fully or in part by the weight selectors and weight register file of FIG. 15. The selection of weights 2910 may be made based on the type of LFE for which equalizer parameters are created.

Adaptive control 2900 may include a filter pattern balancer 2912 configured to further balance the effect of operations between ISI outputs of adaptive control 2900. Filter pattern balancer 2912 may thus enable adaptive control algorithms to provide consistent adaptation results among various data sequences. Filter pattern balancer 2912 may be implemented in any suitable manner, include wholly or in part by column balancers of FIG. 15 or 16. Adaptive control 2900 may include an integrator 2914 configured to integrate the results of filter pattern balancer 2912. Integrator 2914 may be configured to compile, normalize, or otherwise condition the results of filter pattern balancer to generate an equalizer parameter 2916 that is acceptable for use with the LFE.

In one embodiment, adaptive control 2900 may be implemented using only extended filter-pattern decoders. In such an embodiment, adaptive control 2900 may be specifically configured to adaptively control an LFE for long-term residual ISI.

In another embodiment, adaptive control 2900 may include one or more filter-pattern decoders 2906 configured to determine typical, short-term residual ISI. Adaptive control 2900 may include as many filter-pattern decoders 2906 as necessary or desirable to adequately address short-term residual ISI. Each of filter-pattern decoders 2906 may be implemented, for example, by the residual ISI detectors of FIG. 15. Each of filter-pattern decoders 2906 may output residual ISI values, which may be weighted by respective ones of weights 2910, balanced by filter pattern balancer 2912, and integrated into equalizer parameter 2916 by integrator 2914. Filter pattern balancer 2912 and weights 2910 may be configured to adequately balance response for short-term residual ISI and long-term residual ISI. Thus, in such an embodiment, adaptive control 2900 may be configured to adaptively control an LFE for both short-term and long-term residual ISI.

Figure 28:
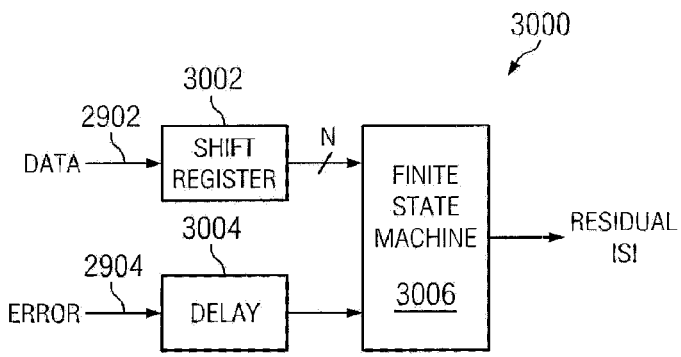
FIG. 28 is a block diagram of an example embodiment of a filter-pattern decoder.

FIG. 28 is a block diagram of an example embodiment of a filter-pattern decoder 3000. In one embodiment, filter-pattern decoder 3000 may implement one or more of extended filter-pattern decoders 2908 of FIG. 27. Data 2902 and error 2904 signals may be received by filter-pattern decoder 3000, which may delay error 2904 to compensate for various actions performed upon data 2902. Filter-pattern decoder 3000 may include a shift register 3002 configured to separate data 2902 into discretized portions which may be compared, matched, and evaluated by finite state machine 3006.

Finite state machine 3006 may be configured to match patterns of data 2902 to detect long-term ISI and, once such matches are made, further use corresponding error 2904 to determine appropriate residual ISI. Finite state machine 3006 may be implemented in any suitable manner, such as by any suitable combination of analog or digital circuitry. In one example, finite state machine 3006 may be implemented by instructions on a computer readable medium for execution by a processor. Finite state machine 3006 may include one or more pairs of patterns for which finite state machine 3006 is searching for matches within data 2902. Such matches may provide the comparisons necessary to perform ISI determinations. The configuration of finite state machine 3006 may be represented by one or more truth tables.

Figure 29:
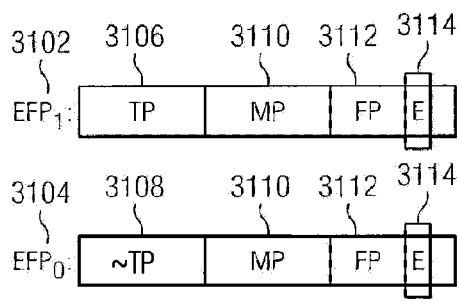
FIG. 29 illustrates example embodiments of a pair of matching extended filter-patterns configured to detect long-term residual ISI.

FIG. 29 illustrates example embodiments of a pair of matching extended filter-patterns 3102, 3104 configured to detect long-term residual ISI. Extended filter-patterns ("EFP") 3102, 3104 may be used by finite state machine 3006 to evaluate data 2902. Extended filter-patterns 3102, 3104 may each include one or more logical sections, representing a portion of received data that is to be matched.

Each of EFPs 3102, 3104 may include patterns corresponding to different portions of a data signal sequence. Such portions may include, for example, a filter pattern, a middle pattern, and a tail pattern. A filter pattern ("FP") may include the data sequence before and after an error value is detected within the data signal sequence. Such an error value, "E", may provide the detection of long-term residual ISI. An FP may be preceded by a middle pattern ("MP") and a tail pattern ("TP"). A TP is referenced by an observed condition wherein ISI from TP on the detected error E is caused by long tail of pulse response with long-term residual ISI.

In one embodiment, a set of matching EFPs may differ only by the respective TP of each EFP. Thus, in the example of FIG. 29, EFP1 3102 and EFP0 3104 may each include the same FP 3112 before and after the error value E 3114, and include the same MP 3110. However, EFP1 3102 and EFP0 3104 may include different TPs. Specifically, EFP1 3102 may include a TP 3106 that is the complement of ~TP 3108. By subtracting E 3114 in EFP1 3102 from E 3114 in EFP0 3104, the effects from FP 3112 and MP 3110 on error E 3114 are cancelled so that long-term residual ISI is detected as the effect from TP 3106 and ~TP 3108.

FP 3112 may include a specific data sequence similar to the filter pattern in a conventional scheme to detect residual ISI. However, EFP1 3102 and EFP0 3104 may use the identical FP 3112, whereas similar filter patterns in a conventional scheme may be different at the data bit related to ISI.

FP 3112 may include a specific data sequence selected such that aggregate ISI from each bit of FP 3112 to the error value of E 3114 is small enough to prevent the error value of E 3114 from maintaining a value of 0 or 1. Furthermore, since FP 3112 is consistent in EFP1 3102 and EFP0 3104, the effect of impulse response for FP 3112 is exactly cancelled when the error for EFP1 3102 is subtracted from the error for EFP0 3104. The length of FP 3112 may be extended to capture more of long-term ISI; however, the longer sequence used to implement FP 3112, the lower the chances of matching FP 3112 with a random sequence from input data. The probability of FP 3112 matching such a sequence decreases exponentially as FP 3112 becomes longer.

In one embodiment, EFP1 3102 and EFP0 3104 may each include a middle pattern such as MP 3110. In another embodiment, EFP1 3102 and EFP0 3104 may not include a middle pattern. MP 3110 may include any data sequence which has a balanced number of data bits with differing values. For example, for data sequences with "0"s and "1"s, MP 3110 may include exactly or approximately same number of "0"s and "1"s so that aggregate ISI for MP 3110 is negligible. In another example, for data sequences with "−3"s, "−1"s, "+1"s, and "+3"s, MP 3110 may be balanced by including the same or approximately number of positive and negative data bits which have the same magnitude. Such a balance may take into account the weight of positive and negative bits. It may be assumed that ISI from most bits of MP 3110 are similar to each other, having similar order of magnitude and the same sign. Therefore, if MP 3110 has exactly same number of "0"s and "1"s then the aggregate ISI may be assumed to be negligible. Furthermore, MP 3110 may be configured to accept an approximately equal number of "0"s and "1"s. The more differences between "0"s and "1"s allowed by MP 3110, the less accurate the determination of ISI that may be made by EFP1 3102 and EFP0 3104. In one embodiment, MP 3110 may be configured to accept an equal number of "0"s and "1"s with an error range of plus or minus five percent. In another embodiment, the "0"s and "1"s required within MP 3110 may be unordered. Consequently, the probability of MP 3110 matching a random sequence from the input data is high even with long sequences of MP 3110. The efficiency of EFP1 3102 and EFP0 3104 may thus be increased by allowing a slightly unequal number of "0"s and "1"s which may increase the probability of MP 3110 matching a random sequence. This increase of efficiency may be made at the expense of degraded accuracy due to the difference between the number of "0"s and "1"s. However, by applying the same restrictions upon MP 3110 in each of EFP 1 3102 and EFP0 3104, the effect on ISI by MP 3110 may be similar between EFP1 3102 and EFP0 3104.

The tail pattern of EFP1 3102 or EFP0 3104 may include any data sequence which has significantly more "0"s than "1"s or significantly more "1"s than "0"s. Either such condition may cause the aggregate ISI from the tail pattern to the error bit to have significant magnitude. The requirements for the relationship between the numbers of "0"s and "1"s is swapped between EFP1 3102 and EFP0 3104 so that the aggregate ISI will have the opposite sign between EFP1 3102 and EFP0 3104. Consequently, while EFP1 3102 may include TP 3106, EFP0 3104 may include ~TP 3108. If TP 3106 includes significantly more "0"s than "1"s, then ~TP 3108 may include significantly more "1"s than "0"s. Conversely, if TP 3106 includes significantly more "1"s than "0"s, then ~TP 3108 may include significantly more "0"s than "1"s. Furthermore, if ~TP 3108 includes significantly more "0"s than "1"s, then TP 3106 may include significantly more "1"s than "0"s. Conversely, if ~TP 3108 includes significantly more "1"s than "0"s, then TP 3106 may include significantly more "0"s than "1"s. The order of "0"s and "1"s in TP 3106 and ~TP 3108 may be unrestricted. Consequently, the probability of TP 3106 and ~TP 3108 matching a random sequence of data is high enough to be practical for use of EFP1 3102 or EFP0 3104, even when the length of TP 3106 and ~TP 3108 is long.

The magnitude of the aggregate ISI may increase as the disparity between the number of "0"s and "1"s in TP 3106 and ~TP 3108 grows. Furthermore, the accuracy of measuring the aggregate ISI may increase as the greater disparity between the number of "0"s and "1"s in TP 3106 and ~TP 3108 grows. However, the greater disparity that is required to match TP 3106 and ~TP 3108 between the number of "0"s and "1"s, the probability of TP 3106 and ~TP 3108 matching in a random data input sequence decreases. Therefore, TP 3106 and ~TP 3108 may include a trade-off between accuracy and speed of ISI measurement. The selection of a given threshold for the relative number of "0"s and "1"s in TP 3106 and ~TP 3108 may be made balancing these considerations. In one embodiment, TP 3106 and ~TP 3108 may specify a 22% difference in the number of "0"s and "1"s.

MP 3110 may be configured to cancel the effect of non-long-term residual ISI and to separate TP 3106 and ~TP 3108 from E 3114 sufficiently such that only long-term residual ISI is detected, while keeping the probability of detecting the pattern in a random data input sequence high enough to be practical. In some embodiments, MP 3110 may be omitted if TP 3106 and ~TP 3108 directly precede FP 3112. Such embodiments may experience degraded accuracy or efficiency, because detected ISI may include non-long-term residual ISI, or because such embodiments may result in FP 3112 of extended length which exponentially slows down adaptation speed through lower matching probability. However, such embodiments may require less hardware to implement.

FP 3112 may be configured to accurately cancel the effect of short-term residual ISI, which may be significant relative to long-term residual ISI. In some embodiments, FP 3112 may be omitted if the location of E 3114 is located near the end of MP 3110. Such embodiments may experience degraded accuracy and efficiency because short-term residual ISI has significant effect on E 3114. However, the performance may be deemed acceptable although it is degraded. Such embodiments may require less hardware to implement.

In some embodiments, both FP 3112 and MP 3110 may be omitted by causing detection of E 3114 near the end of TP 3106 and ~TP 3108. Such embodiments may experience significantly degraded accuracy and efficiency because of short-term residual ISI. However, the performance may be deemed acceptable although it is degraded. Such embodiments may require less hardware to implement.

When compared to using sets of filter patterns with defined, fixed sequences, use of EFP1 3102 and EFP0 3104 may increase the efficiency of detecting long-term residual ISI by exponentially increasing the probability of matching occurrences of random input data. The probability of such matching may be increased by not specifying the exact location of "1"s and "0"s and by assuming that ISI between within the tail portions or the middle portions have similar order of magnitude and the same sign.

FIG. 30 is an illustration of an example truth table 3200 for finite state machines providing adaptive control of low-frequency equalizers. Truth table 3200 may implement finite state machine 3006 of FIG. 28. Furthermore, truth table 3200 may implement the operation of extended filter-patterns 3102, 3104 of FIG. 29. Truth table 3200 may include as many matching sets of extended filter-patterns as necessary or desirable to conduct adaptive control of low-frequency equalizers.

In the example of FIG. 30, truth table 3200 may implement extended filter-patterns 3102, 3104 of FIG. 29 and thus may include an entry 3202 for EFP1 and an entry 3204 for EFP0. Furthermore, truth table 3200 may include a default entry 3206 defining action to be taken if an input data sequence matches none of the other entries of truth table 3200.

Entry 3202 and entry 3204 may include the same criteria as one another for filter pattern and middle pattern, if such patterns are to be included at all. Entry 3202 and entry 3204 may each include tail patterns that are the complement of each other.

In the example of FIG. 30, entry 3202 and entry 3204 may each include a filter pattern of "0 1 0 1 0 1 0" for data bits D0, D1, D2, D3, D4, D5, and D6, respectively. Thus, entry 3202 and entry 3204 may match random input data with the same sequence "0 1 0 1 0 1 0" about the ISI calculation. The error may be detected at data bit D4. While the sequence "0 1 0 1 0 1 0" may be used in example entries 3202 and 3204, other embodiments of truth table 3200 or other embodiments of entries, such as those found in other decoders, may include other sequences for their respective filter patterns.

Entry 3202 and entry 3204 may include middle patterns of any suitable length. In the example of FIG. 30, entry 3202 and entry 3204 may include middle patterns of one hundred bits. In one embodiment, the number of bits may be variable. Furthermore, entry 3202 and entry 3204 may define how closely the number of "0"s and "1"s must match. In the example of FIG. 30, entry 3202 and entry 3204 may define that the number of "0"s and "1"s may vary by four percent, or by plus or minus two counts.

Entry 3202 and entry 3204 may include different tail patterns. However, each tail pattern of entry 3202 and entry 3204 may be of the same length. The length of the tail pattern of each of entry 3202 and entry 3204 may be fixed, variable, and of any suitable length. In the example of FIG. 30, entry 3202 and entry 3204 may be two hundred bits long. Entry 3202 may specify that the number of "1"s is significantly larger than the number of "0"s and entry 3204 may specify that the number of "0"s is significantly larger than the number of "1"s. Thresholds may be used to determine the significance of the counts of "1"s and "0"s, and such thresholds may be defined in absolute, relative, or other suitable manners. In the example of FIG. 30, entry 3202 may require for matching its tail pattern a data sequence with a tail pattern of at least one-hundred twenty-two "1"s and no more than seventy-eight "0"s. Furthermore, entry 3204 may require for matching its tail pattern a data sequence with a tail pattern of at least one-hundred twenty-two "0"s and no more than seventy-eight "1"s.

Consequently, entry 3202 and entry 3204 will match data sequences that have equivalent, or nearly equivalent, portions that match the middle pattern and the filter pattern. Furthermore, entry 3202 and entry 3204 will match complementary data sequences with divergent tail portions that are strongly positive or strongly zero.

Given a match to either entry 3202 or entry 3204, the error associated with the given entry may then be evaluated in truth table 3200. The error may be evaluated at a given data bit. The error evaluation location may be selected based on the arrangement of truth table 3200 among other truth tables, such as those implementing finite state machines within different decoders of FIG. 27. While selection of error evaluation location in truth tables for entries with non-matching filter patterns may be made with reference to the location of non-matching data, truth table 3200 may be made from any suitable error evaluation location (and thus any suitable data point within the filter pattern). In the example of FIG. 30, error may be evaluated at D4. The error may be defined as high and low, "1" and "0", or "1" and "−1" indicating a sign of long-term residual ISI at the error evaluation location. Thus, entry 3202 and entry 3204 may each include a case for possible error readings.

For example, once data has matched entry 3202, the error at D4 may be evaluated to determine whether the error is "1" or "0". If the error of entry 3202, which corresponds to a large number of "1"s in its tail pattern, has an error of "1", then the long-term residual ISI may be determined to be "+1". If the error of entry 3202 has an error of "0", then the long-term residual ISI may be determined to be "−1". If the error of entry 3204, which corresponds to a large number of "0"s in its tail pattern, has an error of "1", then the long-term residual ISI may be determined to be "−1". If the error of entry 3204 has an error of "0", then the long-term residual ISI may be determined to be "+1"

Truth table 3200 may output the long-term residual ISI that has resulted from matching data in a data stream and looking up its error value. If no entry has matched a given data stream, then by default entry 3206 may specify that a zero value for residential ISI should be output. The output of the long-term residual ISI sign may be balanced and aggregated as shown in FIG. 27 to yield an LFE operational parameter that may be fed to an LFE as shown in FIGS. 26 and 27. After such an LFE has adjusted its compensation according to the matching of truth table 3200, truth table 3200 may be yet again employed on a subsequent execution and receipt of new data. In one embodiment, truth table 3200 may attempt to match the complement of the entry that was previously matched before repeating the matching of the previously matched entry. In such an embodiment, truth table 3200 may continue to match other entry pairs within truth table 3200. In another embodiment, truth table 3200 may match any entry within truth table 3200.

Figure 31:
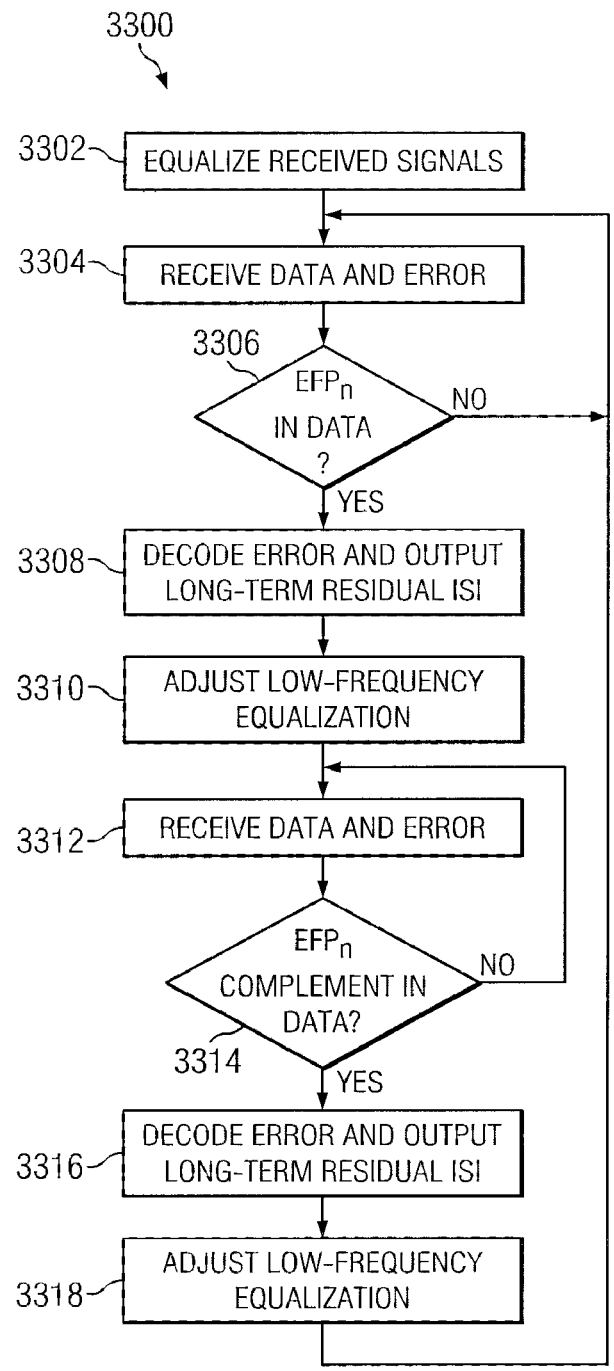
FIG. 31 is an illustration of an example embodiment of a method for adaptive control of low-frequency equalizers.

FIG. 31 is an illustration of an example embodiment of a method 3300 for adaptive control of low-frequency equalizers.

At step 3302, equalization may be conducted upon received signals. Such equalization may include low-frequency equalization. The low-frequency equalization may be configured to reduce ISI and, more specifically, residual ISI. In one embodiment, the residual ISI to be reduced may include long-term residual ISI. In another embodiment, the residual ISI to be reduced may include both long-term and short-term ISI. Although FIG. 31 illustrates step 3302 as occurring once, step 3302 may be repeated whenever necessary or desirable. The equalized signal may be passed through error and data detection.

In step 3304, data and error from the equalized signal may be received. If necessary or desirable, the data and error may be passed through one or more filter pattern decoders. Such filter pattern decoders may include extended filter-pattern decoders, implemented by finite state machines with truth tables with matching filter patterns configured to detect long-term residual ISI. In one embodiment, such filter pattern decoders may also include filter-pattern decoders configured to detect short-term residual ISI. Data may be selected and parsed to be matched against specific extended filter patterns.

In step 3306, it may be determined whether the received data matches any extended filter pattern, such as $EFP_n$. If not, then a zero representing no sign of long-term ISI may be output to a weighting, balancing, and integrating mechanism to be combined with any other possible ISI outputs in generating an operating parameter to be used by the low-frequency equalizer. Furthermore, method 3300 may return to step 3304 to continue waiting for matching data.

If the received data does match an extended filter-pattern, then in step 3308 the error associated with the received data may be decoded in the matched extended filter-pattern to determine long-term residual ISI. The ISI may be output a weighting, balancing, and integrating mechanism to be combined with any other possible ISI outputs in generating an operating parameter to be used by the low-frequency equalizer.

In step 3310, the operating parameter may be used to adjust the operation of the low-frequency equalizer, which may begin to produce updated data. In one embodiment, method 3300 may return to step 3304. In another embodiment, method 3300 may monitor received data for the complement of the matched extended filter-pattern. Such an embodiment may be implemented, for example, by proceeding to step 3312. In a further embodiment, method 3300 may also monitor received data for matches to other extended filter-pattern pairs. Such an embodiment may be implemented, for example, by proceeding to step 3304 in parallel with procession to step 3312.

In step 3312, new data and associated error from the equalized signal may be received. If necessary or desirable, the data and error may be passed through one or more filter pattern decoders. Data may be selected and parsed to be matched against the complement to the extended filter-pattern $EFP_n$ that was previously matched in step 3306. In step 3314, it may be determined whether the received data matches the complement of the extended filter-pattern $EFP_n$. If not, then method 3300 may return to step 3312. If so, then in step 3316 the error associated with the received data may be decoded in the complement to the matched extended filter-pattern to determine long-term residual ISI. In step 3318, the ISI may be output by a weighting, balancing, and integrating mechanism to be combined with any other possible ISI outputs in generating an operating parameter to be used by the low-frequency equalizer. Method 3300 may return to step 3304.

Although the above descriptions are based on the PAM2 signaling scheme which uses only two symbols, the present disclosure can be applied to other signaling schemes which use more than two symbols. For instance, the present disclosure can be applied to the PAM4 signaling scheme which uses four symbols.

Although the present disclosure describes and illustrates particular steps of the method of FIG. 31 as occurring in a particular order, the present disclosure contemplates any suitable steps of the method of FIG. 31 occurring in any suitable order. Although the present disclosure describes and illustrates particular components carrying out particular steps of the method of FIG. 31, such as the elements of FIGS. 25-30, the present disclosure contemplates any suitable components carrying out any suitable steps of the method of FIG. 31. Method 3300 may be implemented wholly or in part by instructions on a computer-readable medium for execution by a processor.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed:

1. A method comprising:
by a detector:
receiving from a low frequency equalizer a first data signal and a first error signal, the first data signal including data points with one of at least two possible values;
matching a tail portion of the first data signal to a tail pattern of a first extended filter-pattern, the tail pattern of the first extended filter-pattern including:
an imbalance between a count of each of the at least two possible values; and
an unfixed sequence; and
based upon the first error signal at a given location within the first data signal, upon matching the tail portion to the tail pattern, and upon the imbalance, producing a first output signal indicating whether a long-term residual intersymbol interference of the first data signal on the first error signal has a positive sign or a negative sign for use in determining an equalizer coefficient.

2. The method of claim 1, further comprising, by the detector:
receiving from the low frequency equalizer a second data signal and a second error signal, the second data signal including data points with one of at least two possible values;
matching a tail portion of the second data signal to a tail pattern of a second extended filter-pattern, wherein a count of each of a plurality of possible values of the tail pattern of the second extended filter-pattern is a complement of the imbalance of the tail pattern of the first extended filter-pattern; and
based upon the second error signal at a given location of the second data signal and upon the imbalance, producing a second output signal indicating whether a long-term residual intersymbol interference of the second data signal on the second error signal has a positive sign or a negative sign.

3. The method of claim 2, wherein:
the first extended filter-pattern includes a fixed portion including an error determination bit, the fixed portion of the first extended filter-pattern separate from the tail pattern of the first extended filter-pattern;
the second extended filter-pattern includes a fixed portion including an error determination bit, the fixed portion of the second extended filter-pattern separate from the tail pattern of the second extended filter-pattern;
the fixed portion of the first extended filter-pattern is equal to the fixed portion of the second extended filter-pattern; and
the fixed portion of the first extended filter-pattern matches a portion of the first data signal and a portion of the second data signal.

4. The method of claim 2, wherein:
the first extended filter-pattern includes a middle portion including a balanced count of each possible data value, wherein the middle portion is unordered and adjacent to the tail pattern of the first extended filter-pattern;
the second extended filter-pattern includes a middle portion equivalent to the middle portion of the first extended filter-pattern;
the middle portion of the first extended filter-pattern matches a portion of the first data signal, wherein the portion of the first data signal is adjacent to the portion of the first data signal; and
the middle portion of the second extended filter-pattern matches a portion of the second data signal, wherein the portion of the second data signal is adjacent to the tail portion of the second data signal.

5. The method of claim 2, further comprising:
constructing an equalizer parameter from at least the first output signal; and
sending the equalizer parameter to the low frequency equalizer;
wherein the second data signal and the second error signal are generated by the low frequency equalizer utilizing the equalizer parameter.

6. The method of claim 1, wherein:
the first extended filter-pattern includes a middle portion including a balanced count of each possible data value, wherein the middle portion is unordered and adjacent to the tail pattern of the first extended filter-pattern; and
the middle portion of the first extended filter-pattern matches a portion of the first data signal, wherein the portion of the first data signal is adjacent to the tail portion of the first data signal.

7. The method of claim 1, wherein:
the first extended filter-pattern includes a fixed portion including an error determination bit, the fixed portion of the first extended filter-pattern separate from the tail pattern of the first extended filter-pattern; and
the fixed portion of the first extended filter-pattern matches a portion of the first data signal.

8. The method of claim 1, further comprising:
constructing an equalizer parameter from at least the first output signal; and
sending the equalizer parameter to the low frequency equalizer.

9. An article of manufacture comprising:
a non-transitory computer readable medium; and
computer-executable instructions carried on the computer readable medium, the instructions readable by a processor, the instructions, when read and executed, for causing the processor to:
receive from a low frequency equalizer a first data signal and a first error signal, the first data signal including data points with one of at least two possible values;
match a tail portion of the first data signal to a tail pattern of a first extended filter-pattern, the tail pattern of the first extended filter-pattern including:
an imbalance between a count of each of the at least two possible values; and
an unfixed sequence;
based upon the first error signal at a given location within the first data signal upon matching the tail portion to the tail pattern, and upon the imbalance, produce a first output signal indicating whether a long-term residual intersymbol interference of the first data signal on the first error signal has a positive sign or a negative sign for use in determining an equalizer coefficient.

10. The article of claim 9, wherein the processor is further caused to:
receive from the low frequency equalizer a second data signal and a second error signal, the second data signal including data points with one of at least two possible values;
match a tail portion of the second data signal to a tail pattern of a second extended filter-pattern, wherein a count of each of a plurality of possible values of the tail pattern of the second extended filter-pattern is a complement of the imbalance of the pattern of the first extended filter-pattern; and based upon the second error signal at a given location of the second data signal and upon the imbalance, produce a second output signal indicating whether a long-term residual intersymbol interference of the second data signal on the second error signal has a positive sign or a negative sign.

11. The article of claim 10, wherein:
the first extended filter-pattern includes a fixed portion including an error determination bit, the fixed portion of the first extended filter-pattern separate from the tail pattern of the first extended filter-pattern;
the second extended filter-pattern includes a fixed portion including an error determination bit, the fixed portion of the second extended filter-pattern separate from the tail pattern of the second extended filter-pattern;
the fixed portion of the first extended filter-pattern is equal to the fixed portion of the second extended filter-pattern; and
the fixed portion of the first extended filter-pattern matches a portion of the first data signal and a portion of the second data signal.

12. The article of claim 10, wherein:
the first extended filter-pattern includes a middle portion including a balanced count of each possible data value, wherein the middle portion is unordered and adjacent to the tail pattern of the first extended filter-pattern;
the second extended filter-pattern includes a middle portion equivalent to the middle portion of the first extended filter-pattern;
the middle portion of the first extended filter-pattern matches a portion of the first data signal, wherein the portion of the first data signal is adjacent to the tail portion of the first data signal; and
the middle portion of the second extended filter-pattern matches a portion of the second data signal, wherein the portion of the second data signal is adjacent to the tail portion of the second data signal.

13. The article of claim 10, wherein the processor is further caused to:
construct an equalizer parameter from at least the first output signal; and
send the equalizer parameter to the low frequency equalizer;
wherein the second data signal and the second error signal are generated by the low frequency equalizer utilizing the equalizer parameter.

14. The article of claim 9, wherein:
the first extended filter-pattern includes a middle portion including a balanced count of each possible data value, wherein the middle portion is unordered and adjacent to the tail pattern of the first extended filter-pattern; and
the middle portion of the first extended filter-pattern matches a portion of the first data signal, wherein the portion of the first data signal is adjacent to the tail portion of the first data signal.

15. The article of claim 9, wherein:
the first extended filter-pattern includes a fixed portion including an error determination bit, the fixed portion of the first extended filter-pattern separate from the tail pattern of the first extended filter-pattern; and
the fixed portion of the first extended filter-pattern matches a portion of the first data signal.

16. The article of claim 9, wherein the processor is further caused to:
construct an equalizer parameter from at least the first output signal; and
send the equalizer parameter to the low frequency equalizer.

17. A system comprising:
a low-frequency equalizer; and
a detector communicatively coupled to the low-frequency equalizer, the detector comprising a first extended filter-pattern;
wherein the detector is configured to:
receive from the low frequency equalizer a first data signal and a first error signal, the first data signal including data points with one of at least two possible values;
match a tail portion of the first data signal to a tail pattern of the first extended filter-pattern, the tail pattern of the first extended filter-pattern including:
an imbalance between a count of each of the at least two possible values; and
an unfixed sequence;
based upon the first error signal at a given location within the first data signal, upon matching the tail portion to the tail pattern, and upon the imbalance, produce a first output signal indicating whether a long-term residual intersymbol interference of the first data signal on the first error signal has a positive sign or a negative sign for use in determining an equalizer coefficient.

18. The system of claim 17, wherein the detector further comprises a second extended filter-pattern and is further configured to:
receive from the low frequency equalizer a second data signal and a second error signal, the second data signal including data points with one of at least two possible values;
match a tail portion of the second data signal to a tail pattern of a second extended filter-pattern, wherein a count of each of a plurality of possible values of the tail pattern of the second extended filter-pattern is a complement of the imbalance of the tail pattern of the first extended filter-pattern; and
based upon the second error signal at a given location of the second data signal and upon the imbalance, produce a second output signal indicating whether a long-term residual intersymbol interference of the second data signal on the second error signal has a positive sign or a negative sign.

19. The system of claim 18, wherein:
the first extended filter-pattern includes a fixed portion including an error determination bit, the fixed portion of the first extended filter-pattern separate from the tail pattern of the first extended filter-pattern;
the second extended filter-pattern includes a fixed portion including an error determination bit, the fixed portion of the second extended filter-pattern separate from the tail pattern of the second extended filter-pattern;
the fixed portion of the first extended filter-pattern is equal to the fixed portion of the second extended filter-pattern; and
the fixed portion of the first extended filter-pattern matches a portion of the first data signal and a portion of the second data signal.

20. The system of claim 18, wherein:
the first extended filter-pattern includes a middle portion including a balanced count of each possible data value, wherein the middle portion is unordered and adjacent to the tail pattern of the first extended filter-pattern;
the second extended filter-pattern includes a middle portion equivalent to the middle portion of the first extended filter-pattern;

the middle portion of the first extended filter-pattern matches a portion of the first data signal, wherein the portion of the first data signal is adjacent to the tail portion of the first data signal; and the middle portion of the second extended filter-pattern matches a portion of the second data signal, wherein the portion of the second data signal is adjacent to the tail portion of the second data signal.

21. The system of claim 18, wherein the detector is further configured to:

construct an equalizer parameter from at least the first output signal; and send the equalizer parameter to the low frequency equalizer;

wherein the second data signal and the second error signal are generated by the low frequency equalizer utilizing the equalizer parameter.

22. The system of claim 17, wherein:

the first extended filter-pattern includes a middle portion including a balanced count of each possible data value, wherein the middle portion is unordered and adjacent to the tail pattern of the first extended filter-pattern; and the middle portion of the first extended filter-pattern matches a portion of the first data signal, wherein the portion of the first data signal is adjacent to the tail portion of the first data signal.

23. The system of claim 17, wherein:

the first extended filter-pattern includes a fixed portion including an error determination bit, the fixed portion of the first extended filter-pattern separate from the tail pattern of the first extended filter-pattern; and the fixed portion of the first extended filter-pattern matches a portion of the first data signal.

24. The system of claim 17, wherein the detector is further configured to:

construct an equalizer parameter from at least the first output signal; and send the equalizer parameter to the low frequency equalizer.

* * * * *

UNITED STATES PATENT AND TRADEMARK OFFICE
CERTIFICATE OF CORRECTION

| | | |
|---|---|---|
| PATENT NO. | : 9,020,082 B2 | Page 1 of 1 |
| APPLICATION NO. | : 13/602904 | |
| DATED | : April 28, 2015 | |
| INVENTOR(S) | : Yasuo Hidaka | |

It is certified that error appears in the above-identified patent and that said Letters Patent is hereby corrected as shown below:

In the claims:

Column 27, Line 66: After "the first data signal is adjacent to the" and before "portion of" insert -- tail --.

Column 28, Line 50: After "the first data signal" and before "upon matching the tail portion" insert -- , --.

Signed and Sealed this
Twentieth Day of October, 2015

Michelle K. Lee
*Director of the United States Patent and Trademark Office*